United States Patent [19]
Tanaka et al.

[11] Patent Number: 5,528,350
[45] Date of Patent: Jun. 18, 1996

[54] IMAGE FORMING APPARATUS WITH REMOVAL OF EXCESS TONER

[75] Inventors: Yasuo Tanaka; Takeshi Kato, both of Toyokawa, Japan; Katsunori Suzuki, Langenhagen, Germany

[73] Assignee: Minolta Co., Ltd., Osaka, Japan

[21] Appl. No.: 149,608

[22] Filed: Nov. 9, 1993

[30] Foreign Application Priority Data

| Nov. 24, 1992 | [JP] | Japan | 4-334914 |
| Nov. 24, 1992 | [JP] | Japan | 4-334915 |
| Nov. 24, 1992 | [JP] | Japan | 4-334916 |
| Jan. 27, 1993 | [JP] | Japan | 5-011878 |
| Feb. 2, 1993 | [JP] | Japan | 5-015653 |

[51] Int. Cl.$^6$ ............................................. G03G 21/00
[52] U.S. Cl. ......................... 355/274; 355/311; 355/207; 347/155
[58] Field of Search ............................ 355/206, 218, 355/271, 274, 296, 311, 207; 347/155

[56] References Cited

U.S. PATENT DOCUMENTS

| 4,183,655 | 1/1980 | Umahashi et al. | 355/274 |
| 4,260,236 | 4/1981 | Tsuda et al. | 355/274 |
| 4,384,785 | 5/1983 | Katoh et al. | 355/218 |
| 5,132,738 | 7/1992 | Nakamura et al. | 355/274 |

FOREIGN PATENT DOCUMENTS 4-83272  7/1990  Japan.

*Primary Examiner*—Joan H. Pendegrass
*Attorney, Agent, or Firm*—Price, Gess & Ubell

[57] ABSTRACT

An image forming apparatus of the electrophotographic type wherein a toner image formed on a photosensitive drum is transferred to recording paper by a transfer roller to form an image is disclosed. When the size of the toner image formed on the photosensitive drum is larger than the size of the recording paper, a portion of the toner image which projects from the recording paper is transferred to the transfer roller and will soil another sheet of recording paper supplied subsequently. Therefore, when comparison between the size of the toner image formed on the photosensitive drum and the size of the recording paper reveals a difference between them, an image forming operation is interrupted and a cleaning device is rendered operative to remove the toner from the transfer roller. Thereupon, presence or absence and the size of an image area protruding from the recording paper are determined from the image size and the recording paper size; and the number and the time of operations of the cleaning device are controlled to minimum values in accordance with the determination.

25 Claims, 21 Drawing Sheets

IMAGE FORMING APPARATUS WITH REMOVAL OF EXCESS TONER

BACKGROUND OF THE INVENTION

1. Field of the Invention

This invention relates, to an image forming apparatus and, more particularly, to an image forming apparatus of the electrophotographic type wherein a toner image formed on a photosensitive member is transferred to a recording medium to form an image.

2. Description of the Prior Art

In an image forming apparatus of the type mentioned, an image is formed as an electrostatic latent image on a charged photosensitive member, and the latent image is developed with toner into a visible toner image. Then, the visible toner image is transferred to a recording medium and then processed by the step of heating fixing processing to obtain a complete image. Various methods are available to transfer a toner image to a recording medium, and one of the methods employs a transfer roller.

Transfer using a transfer roller is performed such that, when a recording medium is passed between a photosensitive member, on which a toner image is formed, and the transfer roller, which is disposed in contact with the photosensitive member, a transfer bias potential of the opposite polarity to that of the charge applied to the toner is applied to the transfer roller to attract and transfer the toner image on the photosensitive member to the recording medium.

In an image forming apparatus having such a construction as described just above, it is a principle to supply a recording medium of a size suitable for the size of an image to be formed. However, several sizes are available for an image formed, for example, on a laser printer, and a recording medium suitable for the size of an image cannot always be supplied. When the size of an image to be formed is smaller than that of the recording medium, no particular trouble will occur. However, in the reverse case, that is, when the toner image formed on the photosensitive member is greater than the recording medium to which the toner image is to be transferred, toner of a portion of the toner image on the photosensitive member which protrudes from the recording medium will be transferred to the transfer roller and may soil another recording medium to be supplied subsequently or substantially cause a drop of the transfer bias potential applied to the transfer roller, resulting in incomplete transfer.

Therefore, it has been proposed to apply, before and/or after printing processing for an image, a potential of a polarity reverse to that for transfer to the transfer roller to transfer toner remaining on the transfer roller to the photosensitive member to clean the transfer roller. An apparatus of the type just described is disclosed, for example, in U.S. Pat. No. 5,132,738. Another image forming apparatus has been proposed and is disclosed in Japanese Patent Laid-Open No. Hei 4-83272 wherein the size of an image to be formed, which has been designated by means of keys of an operation panel or like means, and the size of a recording medium supplied are compared with each other, and when the sizes do not coincide with each other, it is determined that a trouble has occurred and recording processing for the image is interrupted, thereby to prevent soiling caused by transfer of toner.

With the former apparatus wherein the transfer roller is cleaned before and/or after printing processing for an image, much time is required for driving of the apparatus other than for formation of images, resulting in reduction of the life of the apparatus. Further, if cleaning is performed between each two successive image printing cycles, then even if the time required for one printing cycle is equal, if it is tried to obtain a plurality of prints of the image, surplus times are required, and consequently, much time is required.

On the other hand, with the latter apparatus, when the designated image size and the size of the recording medium do not coincide with each other, it is determined that a trouble has occurred and recording of the image is interrupted, and consequently, there is a disadvantage in that it is impossible to automatically restore a recording enabled condition.

Further, with the latter apparatus, it sometimes occurs that, even if the designated image size and the size of the recording medium do not coincide with each other, an image actually formed is accommodated within the recording medium, and it is another disadvantage in that, also in such a case, recording of the image is interrupted. Further, the latter apparatus cannot satisfy the demand to print the image although it is known that the image is partly broken (principally at a peripheral portion thereof).

Further, in such a laser printer as described above, when a recording medium is fed by feeding means, incomplete feeding such as a failure to pick up a recording medium or clogging of a recording medium, that is, jamming, sometimes occurs. Depending upon a timing at which such jamming occurs, a toner image formed already on the photosensitive member may be transferred directly to the transfer roller and soil another recording medium supplied subsequently.

SUMMARY OF THE INVENTION

It is a principal object of the present invention to provide an image forming apparatus which solves the subjects described above and includes improved cleaning means which can efficiently remove toner which is transferred to a transfer roller when the size of an image formed on the photosensitive member upon formation of an image and the size of a recording medium do not coincide with each other.

It is another object of the present invention to provide an image forming apparatus which can remove, by means of cleaning means, toner transferred to a transfer roller when the size of an image formed on a photosensitive member upon formation of an image and the size of a recording medium do not coincide with each other and can automatically re-start an image forming operation when the size of the image is modified or the recording medium is replaced with another recording medium of an optimum size.

It is a further object of the present invention to provide an image forming apparatus which includes cleaning means which can determine, when the size of an image formed on a photosensitive member upon formation of an image and the size of a recording medium do not coincide with each other, the cleaning time in accordance with a size of an area of the image which protrudes from the recording medium and remove toner efficiently.

It is a still further object of the present invention to provide an image forming apparatus which can perform, when the size of an image formed on a photosensitive member upon formation of an image and the size of a recording medium do not coincide with each other, image forming operation while it is known that the sizes do not coincide with each other.

It is a yet further object of the present invention to provide an image forming apparatus which includes cleaning means which can efficiently remove, when some trouble occurs with feeding of a recording medium upon formation of an image, toner transferred to a transfer roller in accordance with a condition of the trouble.

The above and other objects, features and advantages of the present invention will become apparent from the following detailed description and the appended claims, taken in conjunction with the accompanying drawings in which like parts or elements are denoted by like reference characters.

DETAILED DESCRIPTION OF THE PREFERRED EMBODIMENTS

Figure 1:
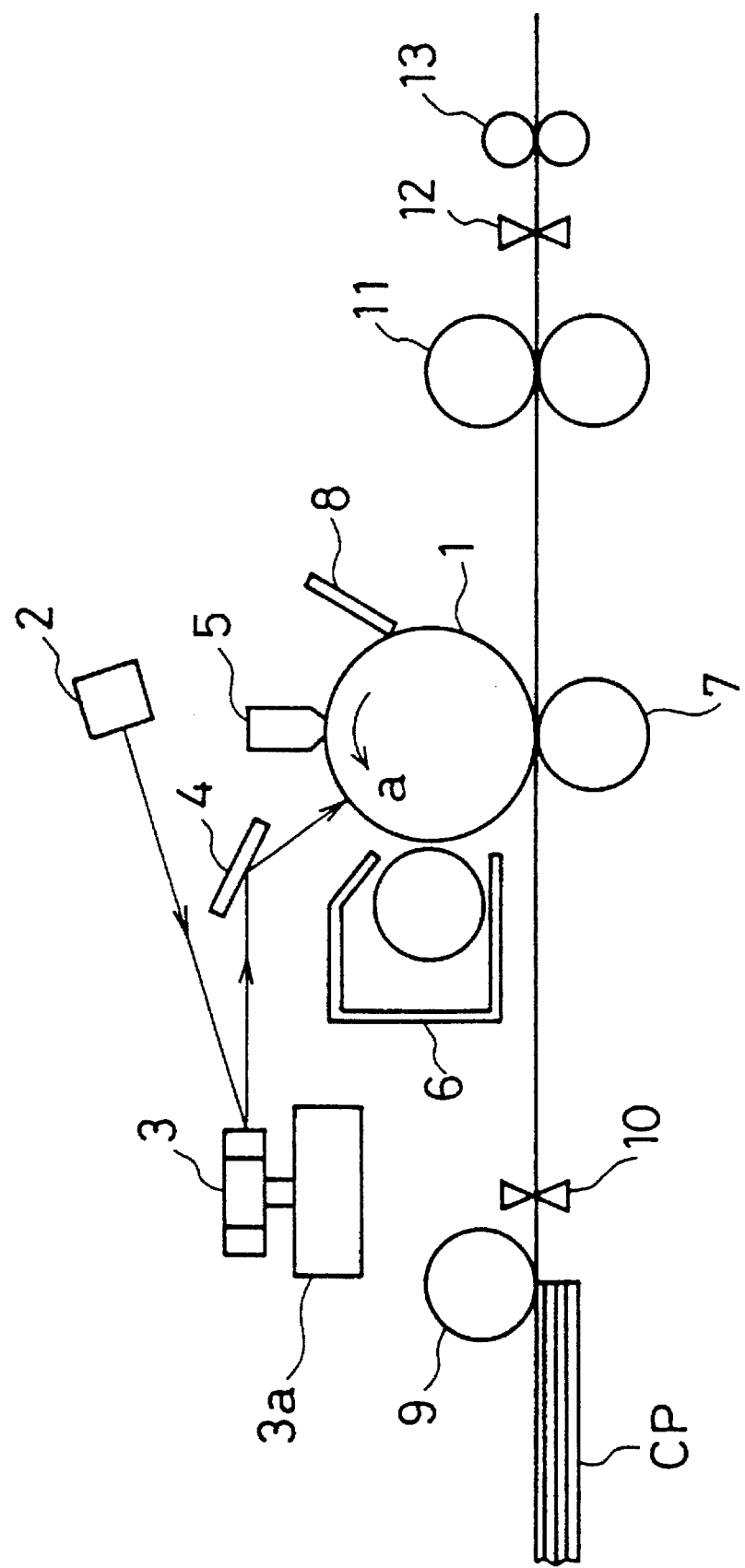
FIG. 1 is a schematic sectional view showing construction of a laser printer to which the present invention is applied.

In the following, embodiments of the present invention will be described. FIG. 1 is a schematic sectional view showing construction of a laser printer to which the present invention is applied. The laser printer shown includes a photosensitive drum 1, a semiconductor laser oscillator 2, a polygon mirror 3, a driving motor 3a for the polygon mirror 3, a reflection mirror 4, a main charger 5, a developing unit 6, a transfer roller 7, and a cleaning blade 8. The laser printer further includes a paper feed roller 9, a paper feed sensor 10, a fixing roller 11, a paper discharge sensor 12, and a paper discharge roller 13. Sheets of recording paper CP of an arbitrary size are accommodated in a known universal cassette. However, recording paper CP may alternatively be supplied into the laser printer through a manual inlet port for paper.

Operation of the laser printer of the construction described just above will be described briefly. First, the surface of the photosensitive drum 1 is charged with predetermined charge by the main charger 5. A laser beam is emitted from the semiconductor laser oscillator 2 and modulated in accordance with an image signal. The laser beam is then scanned in a main scanning direction by the polygon mirror 3 and then reflected by the reflection mirror 4 so that it is introduced to the photosensitive drum 1. The photosensitive drum 1 is rotated in the direction indicated by an arrow mark a, and consequently, scanning in a subsidiary direction is performed so that a latent image of the image is formed on the photosensitive drum 1. The latent image is developed by the developing unit 6 to form a toner image.

Meanwhile, the paper feed roller 9 is rendered operative in response to a paper feeding instruction to start feeding of recording paper CP. Consequently, the recording paper CP is fed along a feeding path and then stopped once by a timing roller not shown, whereafter it is fed to a transfer position in a timed relationship with a timing at which the toner image on the photosensitive drum 1 comes to the transfer position. In this instance, since a bias potential of a polarity opposite to that of the charge of the toner on the photosensitive drum 1 is applied to the transfer roller 7, the toner image on the photosensitive drum 1 is transferred to the recording paper CP. The toner image transferred to the recording paper CP is fixed to the recording paper CP by the fixing roller 11 and then discharged by the discharge roller 13. The recording paper CP thus discharged is detected by the paper discharge sensor 12.

It is to be noted that, after transfer of the image, the toner remaining on the photosensitive drum 1 is removed by the cleaning blade 8.

Figure 2:
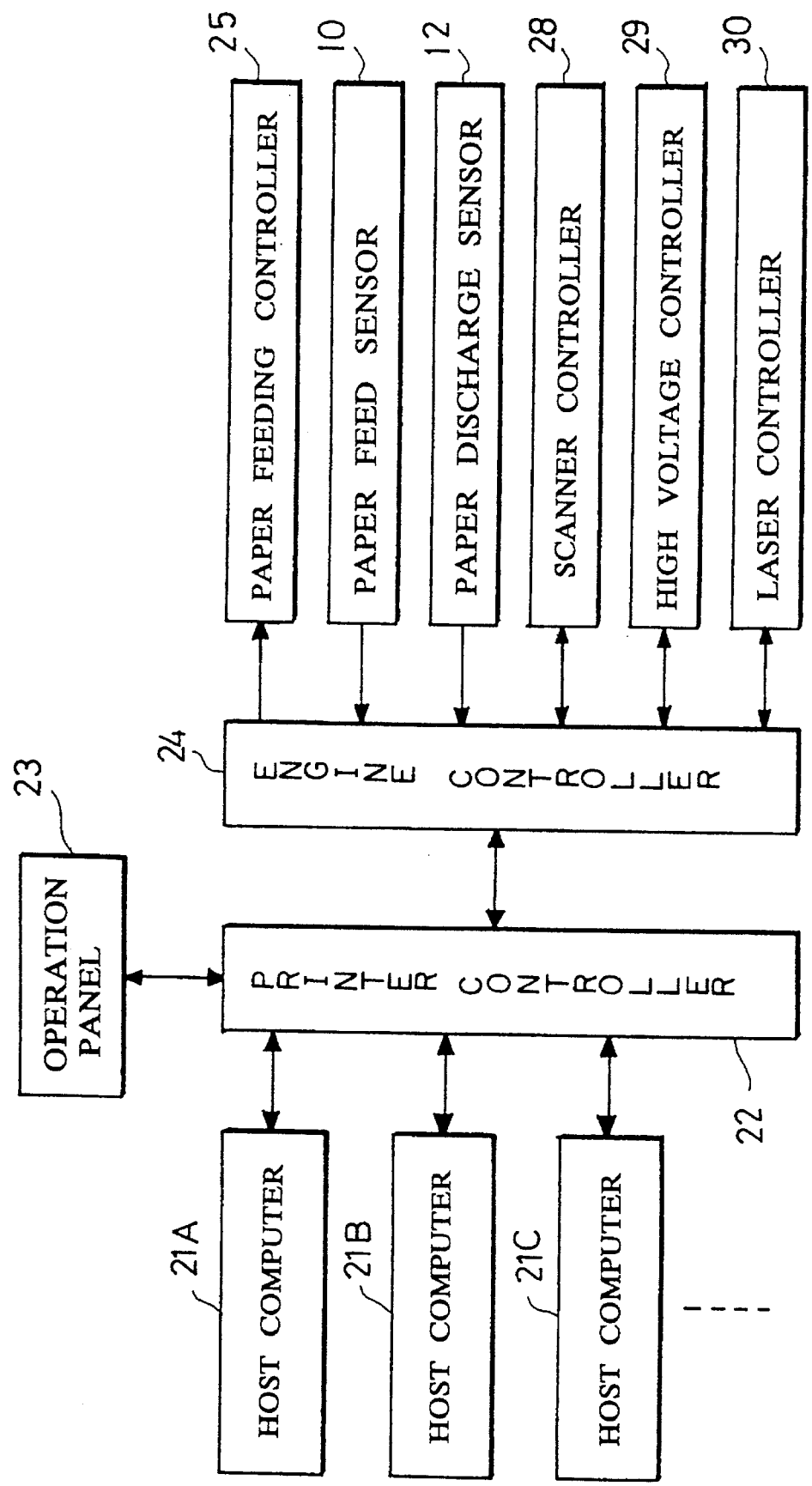
FIG. 2 is a block diagram showing construction of a control circuit of the laser printer of FIG. 1.

FIG. 2 is a block diagram showing construction of a control circuit of the laser printer to which the present invention is applied. The control circuit shown includes host computers 21A, 21B and 21C, a printer controller 22, an operation panel 23, and an engine controller 24 for controlling the components of the printer in accordance with instructions of the printer controller 22. A paper feeding controller 25 for controlling feeding of recording paper, the paper feed sensor 10 disposed on the feeding path, the paper discharge sensor 12, a scanner controller 28 for controlling scanning by the polygon mirror 3, a high voltage controller 29 for performing high voltage control such as charging of the photosensitive drum 1 and application of the developing bias voltage and the transfer bias to the transfer roller 7, and a laser controller 30 for performing modulation control of a laser beam are connected to input and output ports of the engine controller 24.

Printer controlling information such as a recording paper size is inputted from the operation panel 23 to the printer controller 22. When the printer controller 22 receives a print request signal from any of the host computers 21A, 21B, 21C, . . . , it outputs a printing instruction to the engine controller 24. Consequently, the engine controller 24 delivers an instruction to the paper feeding controller 25 to start feeding of paper and simultaneously delivers an instruction to the scanner controller 28 to make preparations for scanning, and further sets the charging and developing biases to the photosensitive drum 1 by way of the high voltage controller 29 to make preparations for printing. Further, the engine controller 24 outputs a vertical synchronization requesting signal to the printer controller 22 and waits reception of a vertical synchronizing signal. When a vertical synchronizing signal is received, the engine controller 28 modulates a laser beam in response to an image signal inputted to the laser controller 30 from the host computer 21A, 21B, 21C, . . . by way of the printer controller 22 so that a latent image of the image is formed on the photosensitive drum 1.

In the operation described above, when sheets of recording paper CP are accommodated in a paper supply cassette and the size of the recording paper CP is known in advance, no specific trouble will occur if the paper feeding controller 25 is controlled so that recording paper of the size which coincides with the size of an image to be formed is supplied.

However, when the size of the recording paper is not known in advance such as when recording paper is supplied from the manual inlet port for paper, the size of the recording paper may not coincide with the size of an image to be printed. When the size of the recording paper is larger than the size of the image to be printed, no such problem as a partial drop of an image occurs, but on the contrary when the size of the recording paper is smaller than the size of the image to be printed, only incomplete recording wherein the image partially drops takes place, and besides toner, which has formed part of the image, adheres directly to the transfer roller 7 and will soil another sheet of recording paper to be supplied later. Subsequently, processing for such an instance will be described.

First, determination of the size of recording paper will be described. While the size of recording paper is determined from the length of the recording paper in the feeding direction, since the length cannot be measured directly, the paper feed sensor 10 is disposed in the proximity of the paper feed roller 9 on the feeding path for recording paper as shown in FIG. 1, and the length of the recording paper in the feeding direction (that is, the dimension of the recording paper in the subsidiary scanning direction) is determined from the interval of time required for the leading edge and the trailing edge of the recording paper to pass the paper feed sensor 10. Once the length of the recording paper is determined, also the dimension of the recording paper in the widthwise direction, that is, the dimension of the recording paper in the main scanning direction, can be determined from the standards for recording paper sizes.

Even if the size of recording paper detected in this manner does not coincide with the size of an image, at the point of time when the size of the recording paper is detected, a toner image formed on the photosensitive drum 1 already approaches or reaches the transfer position. Consequently, when the size of the recording paper is smaller than the size of the image, a portion of the toner image on the photosensitive drum 1 which protrudes from the recording paper CP is transferred to the transfer roller 7, resulting in soiling to the transfer roller 7. Therefore, cleaning processing to remove unnecessary toner transferred to the transfer roller 7 is required.

Figure 3:
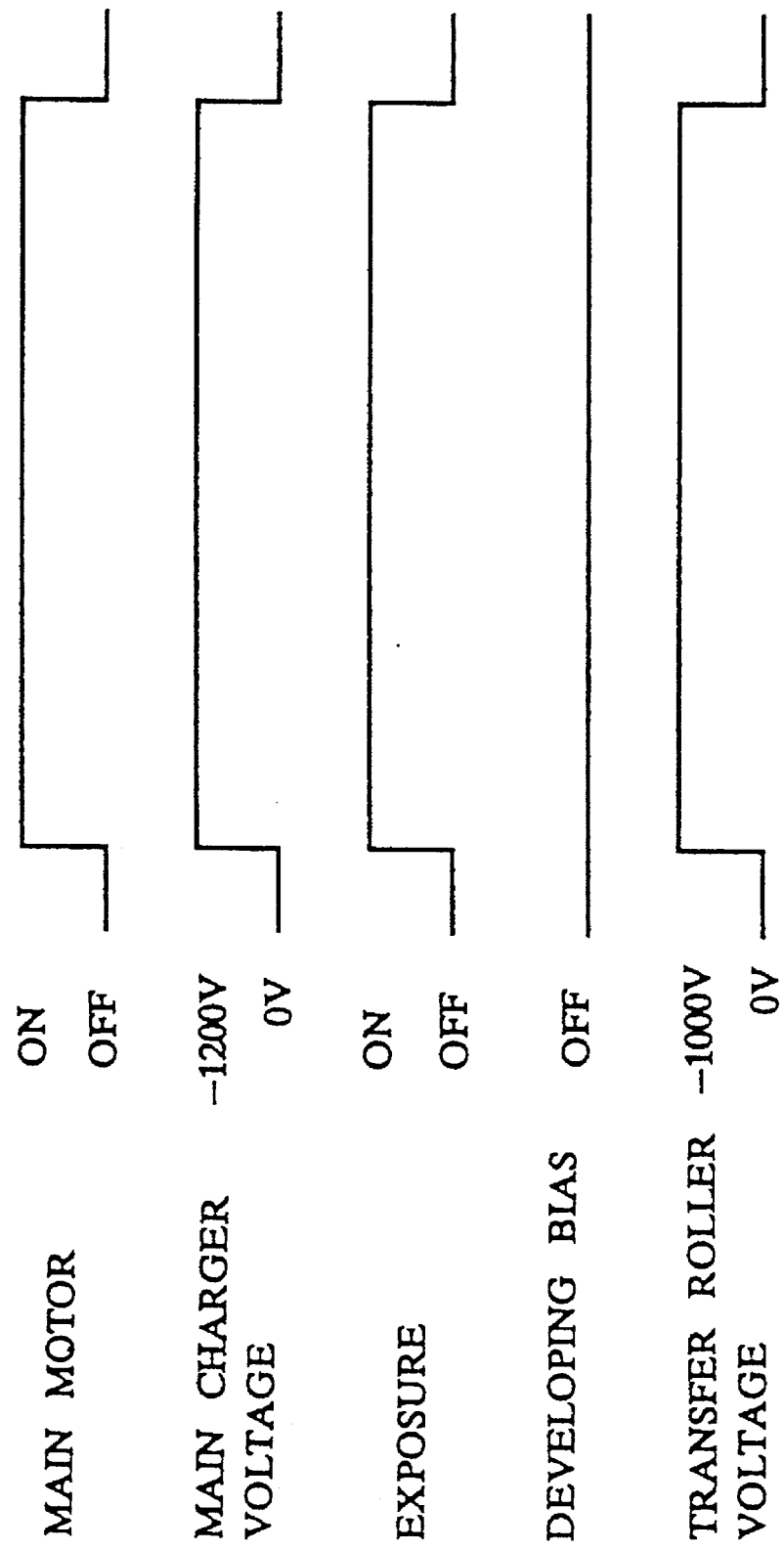
FIG. 3 is a timing chart showing timings of cleaning processing.

FIG. 3 is a timing chart illustrating timings of cleaning processing described above. First, a main motor of the laser printer not shown is energized to rotate the photosensitive drum 1, and the surface of the photosensitive drum 1 is charged in the negative (to about −800 V) by a potential of the negative polarity (about −1,200 V) applied to the main charger 5. The entire surface of the photosensitive drum 1 is exposed to a laser beam, and consequently, the potential at the surface of the photosensitive drum 1 drops (about −200 V). Meanwhile, a negative bias potential (about −1,000 V) is applied to the transfer roller 7, and consequently, toner (charged in the negative) sticking to a portion of the transfer roller 7 corresponding to a protruding portion of the image is transferred to the surface of the photosensitive drum 1. The processing described above is performed for at least one complete rotation of the transfer roller 7 to complete the cleaning processing of the transfer roller 7.

It is to be noted that, in the timing chart of FIG. 3, the time required for the surface of the photosensitive drum 1 to move between the components used to several processes such as the main charger 5, the developing unit 6 and the transfer roller 7 is omitted, and accordingly, the timings at which the processes are actually performed are displaced by a time required for such movement.

Figure 4:
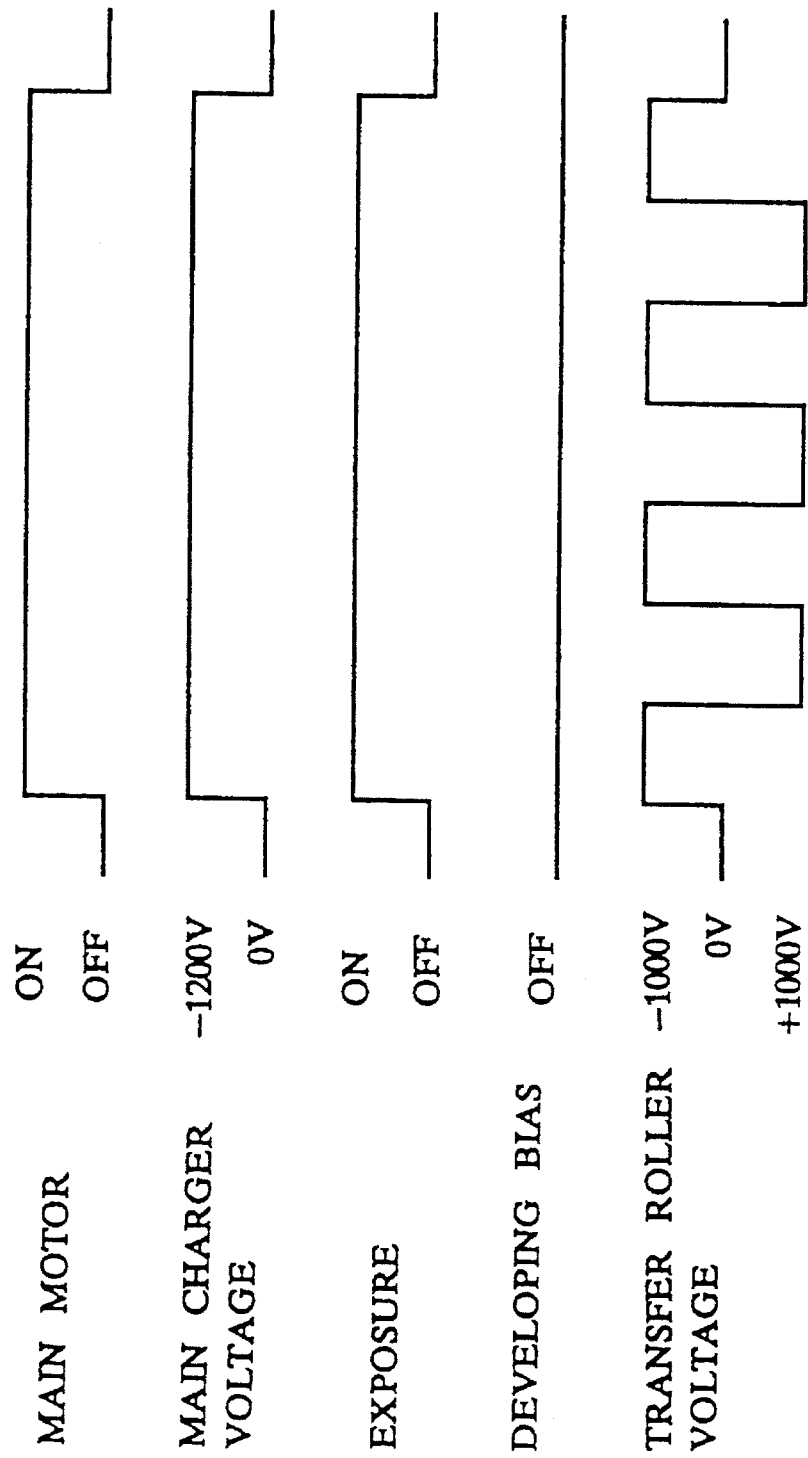
FIG. 4 is a timing chart showing another example of timings of cleaning processing.

FIG. 4 is a timing chart illustrating another example of timings in cleaning processing. Referring to FIG. 4, a positive bias (about +1000 V) and a negative bias (about −1000 V) are applied alternately after each predetermined interval of time to the transfer roller 7. In particular, when the positive bias is applied to the transfer roller 7 upon cleaning, even if toner charged positively and toner of the opposite polarity remain sticking to the surface of the photosensitive drum 1 as a result of development, toner can be prevented from being transferred to the transfer roller.

Figure 5:
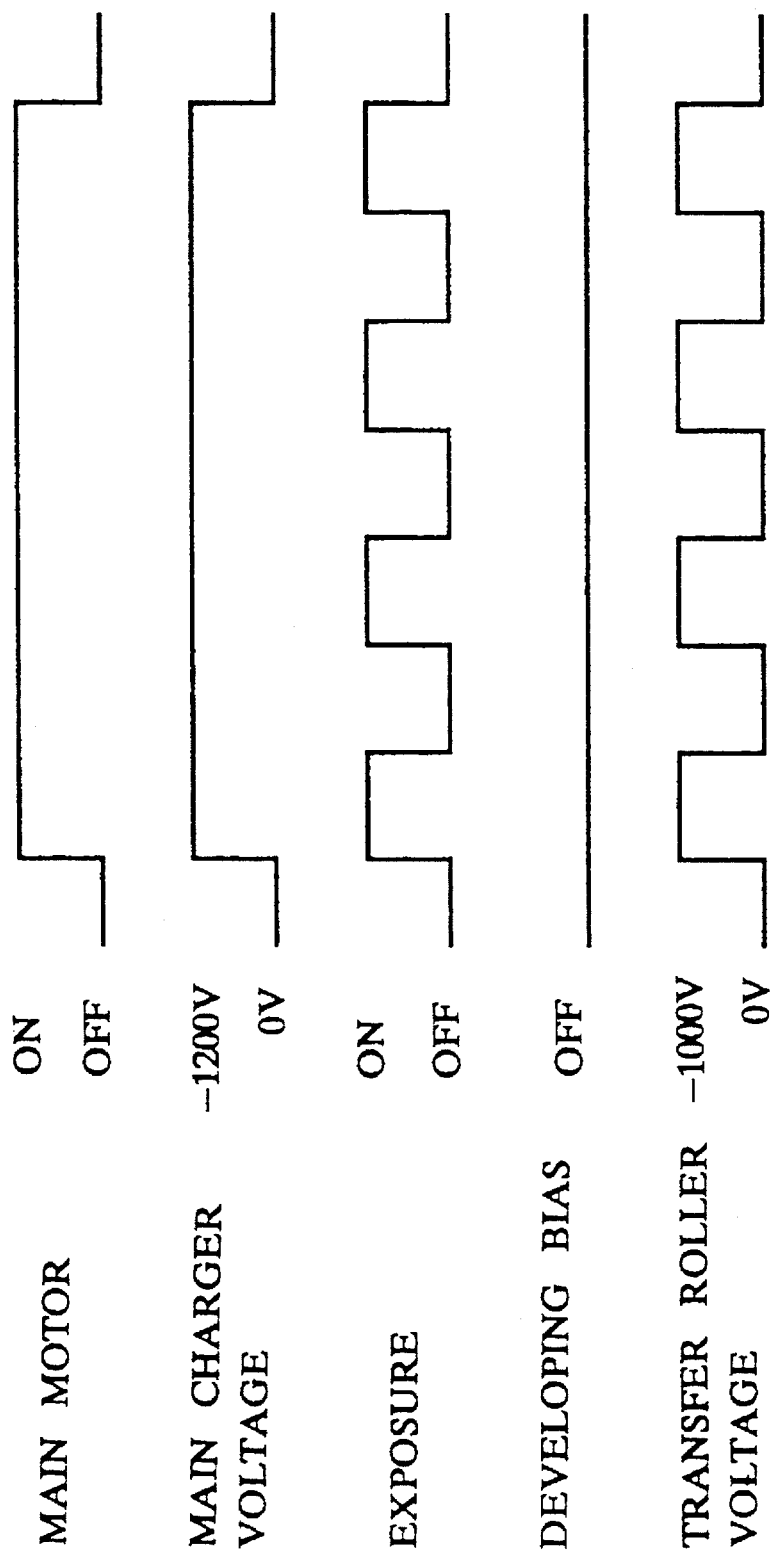
FIG. 5 is a timing chart showing a further example of timings of cleaning processing.

FIG. 5 is a timing chart illustrating a further example of timings of cleaning processing. Referring to FIG. 5, in the cleaning processing illustrated, exposure of the photosensitive drum 1 to a laser beam and application of a negative bias to the transfer roller 7 are performed intermittently after each predetermined interval of time.

Figure 6:
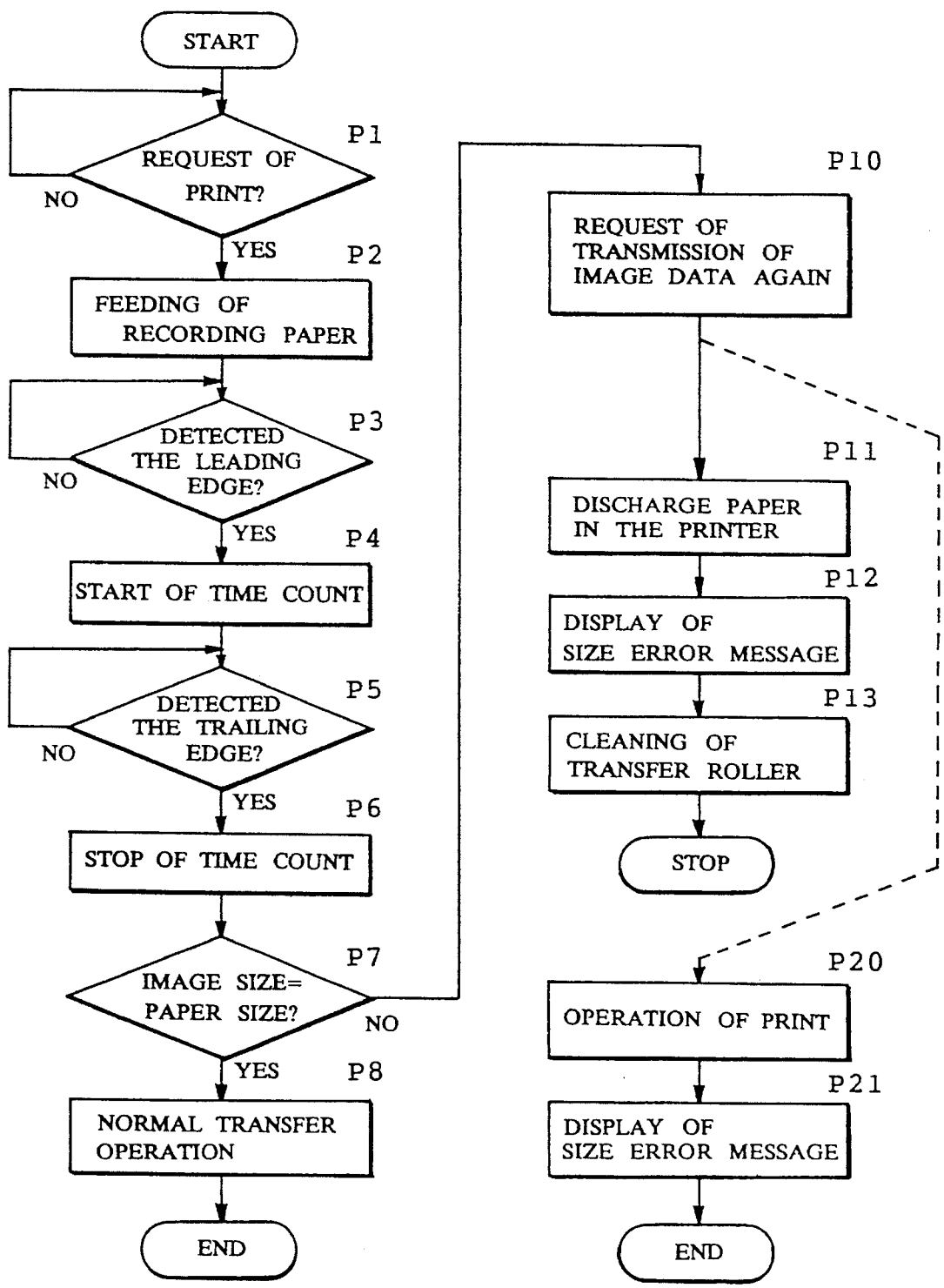
FIG. 6 is a flow chart illustrating determination of a recording paper size and cleaning processing for a transfer roller executed by the control circuit of FIG. 5.

FIG. 6 is a flow chart illustrating determination of the size of recording paper executed by the printer controller 22 and cleaning processing for the transfer roller 7 when the size of an image does not coincide with the size of recording paper.

Referring to FIG. 6, the printer controller 22 waits until a print request signal is received (step P1), and then when a print request signal is received, the paper feed roller 9 is driven to feed recording paper CP (step P2). Here, it is assumed that the size of the recording paper CP thus supplied is unknown.

It is determined whether or not the leading edge of the recording paper CP is detected by the paper feed sensor 10 (step P3), and if it is detected, then counting of time is started by means of recording paper length detection timer (step P4). Then, it is determined whether or not the trailing edge of the recording paper is detected by the paper feed sensor 10 (step P5), and then when it is detected, the counting of time by the recording paper length detection timer is stopped (step P6) to determine the size of the thus fed recording paper from the counting time of the recording paper length detection timer.

Since the size of an image to be formed on the photosensitive drum 1 has been recognized on the host computer side before printing, the image size and the recording paper size are compared with each other, and it is determined whether or not the image size coincides with the recording paper size (step P7). When the image size coincides with the recording paper size, it is determined that regular printing is possible, and the printer controller 22 causes normal transferring operation to be executed (step P8).

On the contrary if it is determined at step P7 that the image size does not coincide with the recording paper size, it is determined that regular printing is impossible, and the printer controller 22 outputs a request of transmission of image data to the host computer in order to make preparations for printing of the image again (step P10) and then causes all sheets of recording paper remaining in the printer to be discharged from the printer (step P11).

Thereafter, the printer controller 22 displays a size error message which indicates to the operator that the image size does not coincide with the recording paper size and printing is impossible (step P12), and then a bias potential necessary to remove toner sticking to the transfer roller 7 is applied to the transfer roller 7 to effect cleaning processing of transferring the toner on the transfer roller 7 to the photosensitive drum 1 (step 13), thereby ending the operation. It is to be noted that the unnecessary toner transferred to the photosensitive drum 1 then is removed by ordinary cleaning processing of the photosensitive drum 1 by the cleaning blade 8. It is to be noted that processing at steps beginning with step P20 will be described later.

The cleaning processing to transfer toner transferred thereto from the transfer roller 7 to the photosensitive drum 1 may be started in response to a timing at which the trailing edge of recording paper CP passes by the paper feed sensor 10 or alternatively be started immediately after it is determined that the recording paper size does not coincide with the image size or else after all sheets of recording paper remaining in the printer are discharged from the printer.

Figure 7:
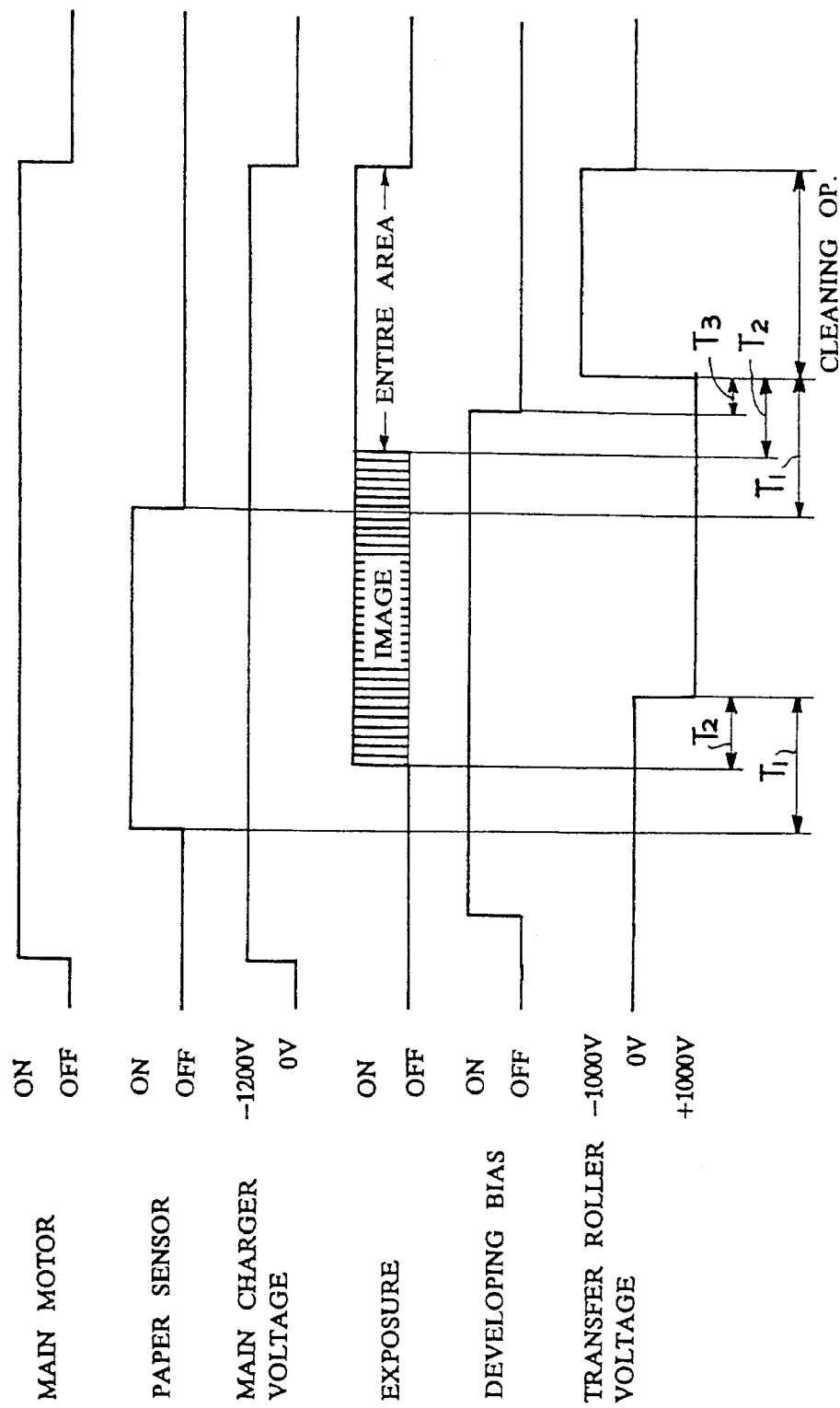
FIG. 7 is a timing chart showing timings of cleaning processing which is performed in response to a timing at which the trailing edge of recording paper passes a paper feed sensor.

FIG. 7 is a timing chart which illustrates timings of cleaning processing which is performed in response to a timing at which it is determined as a result of detection of the size of recording paper that the recording paper size does not coincide with the image size. Here, timings are indicated which take a time required for movement of recording paper and a time required for successive movement of the surface of the photosensitive drum 1 between the main charger 5, the developing unit 6, the transfer roller 7 and so forth into consideration.

First, the main motor is energized to start feeding of recording paper CP and rotate the photosensitive drum 1, and the surface of the photosensitive drum 1 is charged to the negative (about −800 V) by the potential of the negative polarity (about −1200 V) applied to the main charger 5. After the time T1–T2 after detection of the leading edge of the recording paper CP by the paper feed sensor 10, formation of a latent image on the surface of the photosensitive drum 1 is started by a laser beam modulated in accordance with image data. The latent image is developed into a toner image by the developing unit 6, and the toner image is transferred to the recording paper CP at the transfer position after the time T1 after the detection of the leading edge of the recording paper.

Thereafter, the trailing edge of the recording paper CP is detected by the paper feed sensor 10. Then, if it is determined that the recording paper size is different from the image size, then exposure to a laser beam modulated in accordance with the image data is interrupted after the time T1–T2 after detection of the trailing edge of the recording paper CP, and exposure of the entire area to the laser beam for cleaning is started. After the latent image corresponding to the trailing edge of the recording paper CP passes the developing unit 6 after the time T1–T3 after the detection of the trailing edge of the recording paper CP, the developing bias is switched off.

Further, a negative bias voltage (about −1000 V) is applied to the transfer roller 7 after the time T1 after the detection of the trailing edge of the recording paper CP to effect cleaning of the transfer roller 7. By effecting the timing control, it is possible to obtain an image at least corresponding to the size of the recording paper. Here, the time T1 is a time required to feed the recording paper CP so that the leading edge or the trailing edge of it moves from the paper feed sensor 10 to the transfer position; T2 is a time required for the surface of the photosensitive drum 1 to move from the exposure position to the transfer position; and T3 is a time required for the surface of the photosensitive drum 1 to move from the developing position to the transfer position.

Figure 8:
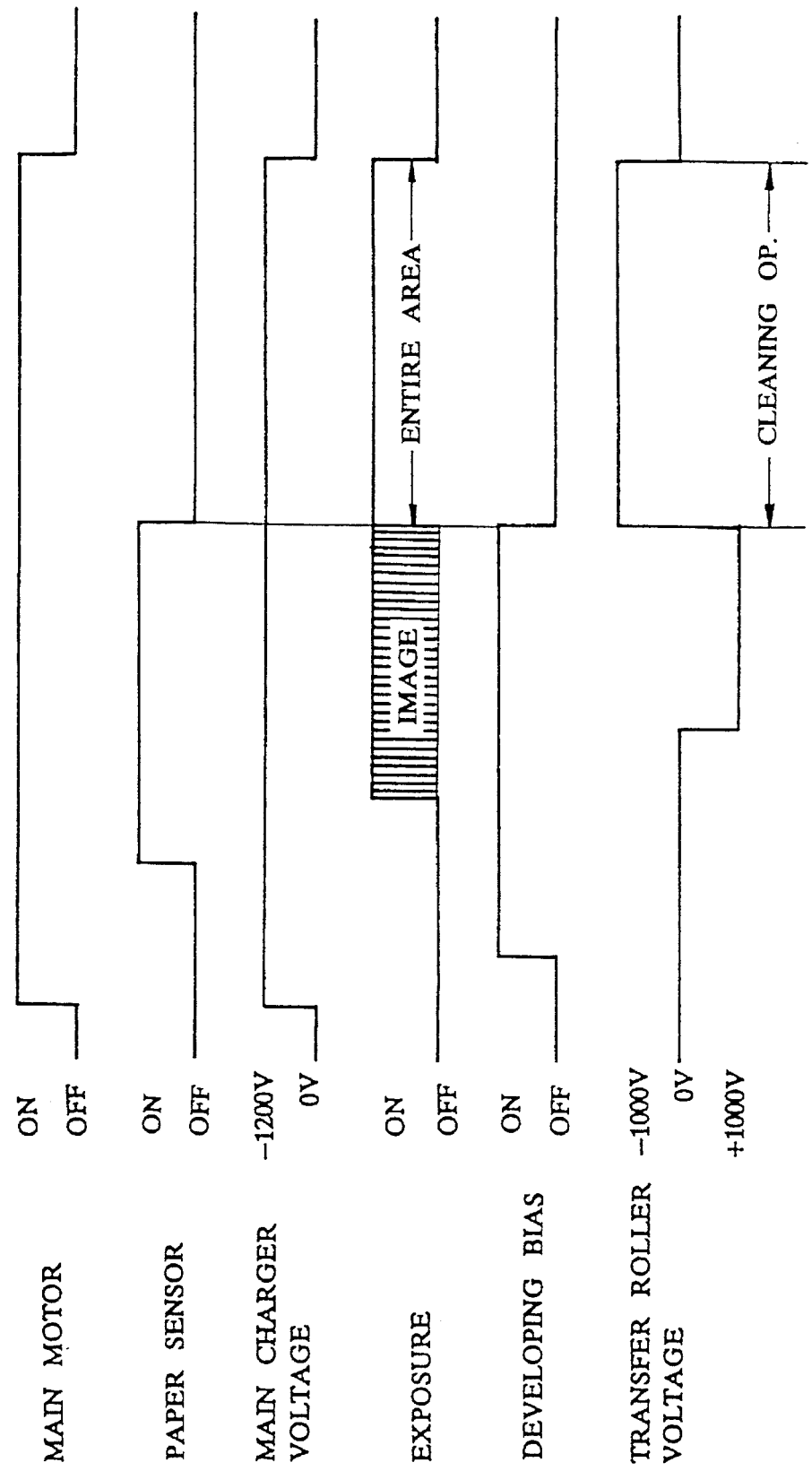
FIG. 8 is a timing chart showing timings of cleaning processing which is performed in response to a timing at which it is determined that the size of recording paper does not coincide with the size of an image.

FIG. 8 is a time chart when cleaning processing is performed immediately after it is determined that the recording paper size does not coincide with the image size. Here, if the trailing edge of recording paper CP is detected by the paper feed sensor 10 and it is determined that the recording paper size is different from the image size, then exposure to a laser beam modulated in accordance with image data is interrupted immediately, and exposure of the entire area to the laser beam for cleaning is started. Then, the developing bias potential is switched off, and a negative bias potential (about −1000 V) is applied to the transfer roller 7 to effect cleaning of the transfer roller 7. By executing the timing control, the starting time of cleaning processing begins at an earlier timing and soiling to the transfer roller 7 can be minimized. Consequently, the waiting time until formation of a next image is started can be reduced.

It is to be noted that, even if it is determined at step P7 of the flow chart of FIG. 6 that the image size does not coincide with the recording paper size, when the image size is smaller than the recording paper size, the control sequence may advance to the step for performing a regular transferring operation (step P8) since the image to be printed will have no loss.

In the meantime, it sometimes occurs that, when a print request signal is outputted from a host computer, a print size is designated. In this instance, the designated print size and a recording paper size detected are compared with each other, and when the print size is larger, it may be determined as a size error. However, since the size of an image to be actually formed is sometimes smaller than the print size, priority may be given to the size of an image to be actually formed such that the image size and the recording paper size are compared with each other and, only when the image size is larger than the recording paper size, cleaning processing is performed. This eliminates possible performance of useless cleaning processing.

In the processing described above, when the image size does not coincide with the recording paper size, all sheets of recording papers remaining in the printer are discharged so that no printing may be performed at all. However, even if the image size does not coincide with the recording paper size, if it is desired to perform printing, cleaning processing to transfer toner sticking to the transfer roller 7 to the photosensitive drum 1 may be incorporated so that a printing operation may be performed continuously while cleaning processing is performed. This processing is illustrated as printing operation and size error display at steps beginning with the step P10 subsequently to the step P20 of the flow chart of FIG. 6. The processing will be described subsequently.

Figure 9:
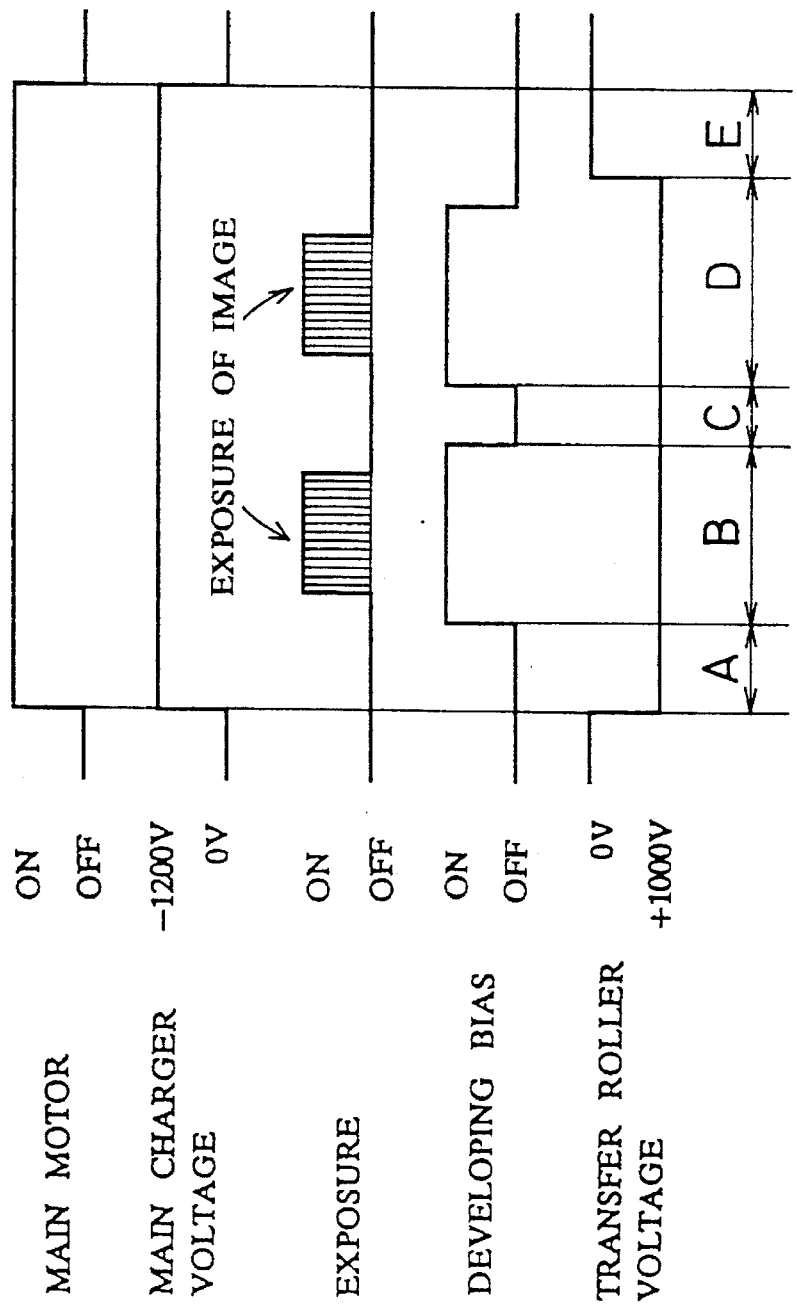
FIG. 9 is a timing chart showing timings of ordinary printing processing.

First, for reference, a regular printing operation when the image size coincides with the recording paper size will be described. FIG. 9 is an example of a timing chart illustrating timings at which two prints are successively processed when the image size coincides with the recording paper size. First, the main motor is energized to rotate the photosensitive drum 1, and the surface of the photosensitive drum 1 is charged to the negative by the main charger 5.

Then, exposure of the surface of the photosensitive drum 1 to a laser beam for a first image is performed so that a latent image is formed on the surface of the photosensitive drum 1, and then developing processing is performed with toner charged to the negative to produce a visible image. A positive transfer bias potential is applied to the transfer roller 7 so that the toner image formed in the photosensitive drum 1 is transferred to recording paper fed there (portion B).

Subsequently, exposure of the surface of the photosensitive drum 1 to the laser beam for a second image is performed so that a latent image is formed on the surface of the photosensitive drum 1, and then developing processing is performed with toner to produce a visible image. The positive transfer bias potential is applied to the transfer roller 7 so that the toner image on the photosensitive drum 1 is transferred to another sheet of recording paper fed thereto, thereby completing the regular printing processing (portion D).

Figure 10:
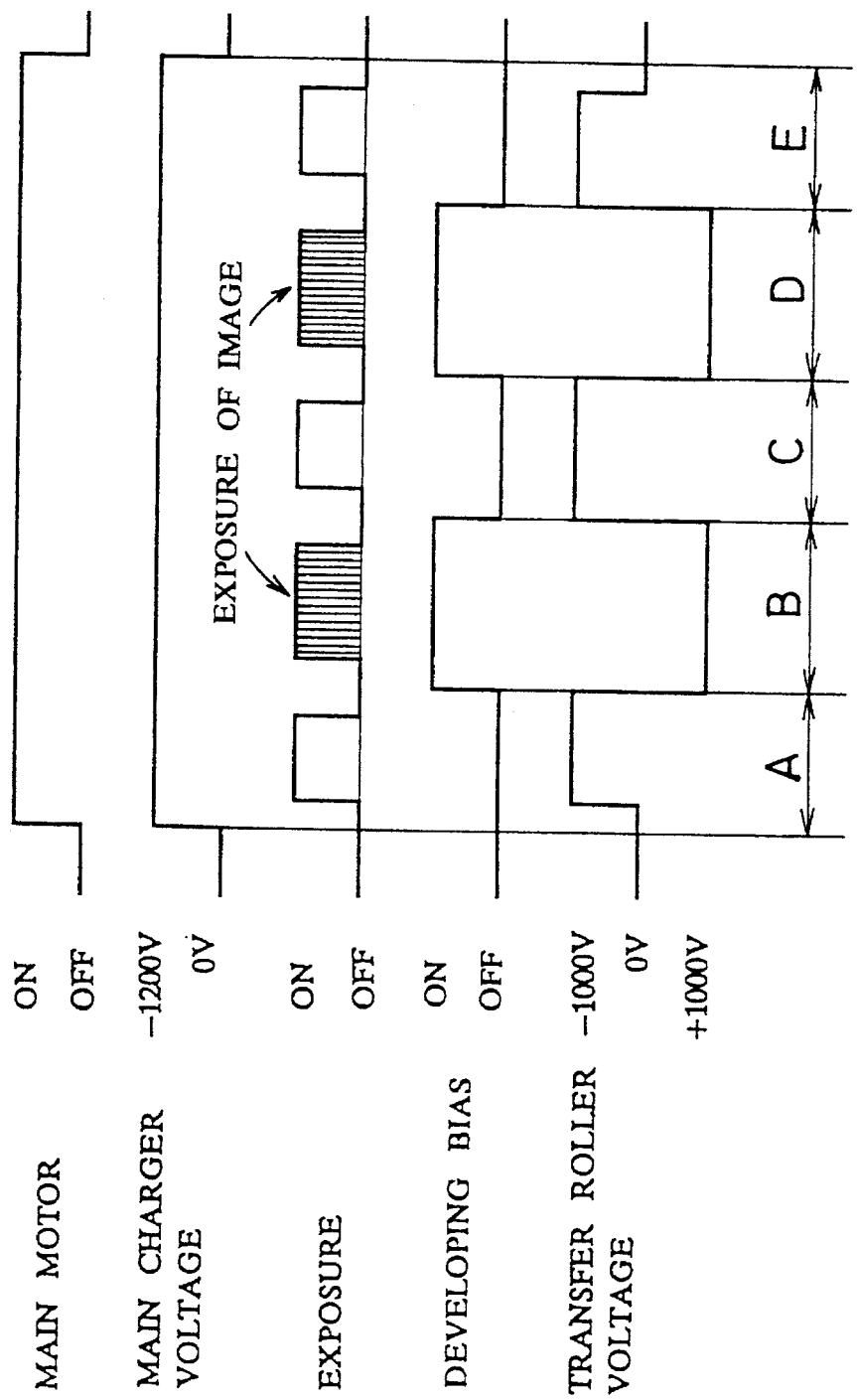
FIG. 10 is a timing chart showing timings of printing processing including cleaning processing.

In contrast, an example of a timing chart indicating times at which processing for two prints (which corresponds to the processing at steps beginning with the step P20 in FIG. 6) when the image size does not coincide with the recording paper size is illustrated in FIG. 10.

Referring to FIG. 10, the main motor is first energized to rotate the photosensitive drum 1, and the surface of the photosensitive drum 10 is charged to the negative by the main charger 5. The surface of the photosensitive drum 1 is exposed over the entire area thereof uniformly by the laser beam while a negative bias potential is applied to the transfer roller 7 to perform cleaning processing. In this instance, the developing unit does not operate (the developing bias is off) and feeding of recording paper is not performed (portion A).

Subsequently, exposure of the surface of the photosensitive drum 1 to the laser beam for a first image is performed so that a latent image is formed on the surface of the photosensitive drum 1, and developing processing is performed with toner to produce a visible image. A positive bias potential is applied to the transfer roller 7 so that the toner image formed on the photosensitive drum 1 is transferred to recording paper fed there (portion B). Thereafter, the surface of the photosensitive drum 1 is exposed uniformly over the entire area thereof to the laser beam again, and the negative bias potential is applied to the transfer roller 7 to perform cleaning processing (portion C).

Then, exposure of the surface of the photosensitive drum 1 to the laser beam for a second image is performed so that a latent image is formed on the surface of the photosensitive drum 1, and the latent image is processed by developing processing with toner to produce a visible image. The positive bias potential is applied to the transfer roller 7 so that the toner image on the photosensitive drum 1 is transferred to another recording paper fed there (portion D). Thereafter, the surface of the photosensitive drum 1 is exposed uniformly over the entire area thereof to the laser beam and the negative bias potential is applied to the transfer roller 7 to perform cleaning processing (portion E).

As can be seen from comparison between the timing chart shown in FIG. 9 and the timing chart shown in FIG. 10, cleaning processing is performed in a regular printing operation when the image size coincides with the recording paper size. On the other hand, when the image size does not coincide with the recording paper size, cleaning processing is performed prior to exposure of the photosensitive drum to the light beam for the first image, between formations of the first and second images and after the formation of the second image. Such cleaning processing need not necessarily be performed between formations of different images and may be performed at a suitable timing when necessary.

The period of time for which cleaning processing is performed is set suitably in accordance with a degree of soiling to the transfer roller or with a cleaning condition. In particular, if the developing bias potential is changed for adjustment of the density of an image, then the amount of toner adhering to the surface of the photosensitive drum 1 is varied. Accordingly, when the developing bias does not exist (for example, lower than −300 V), the degree of soiling to the transfer roller 7 decreases, and consequently, the cleaning time can be reduced.

Figure 11:
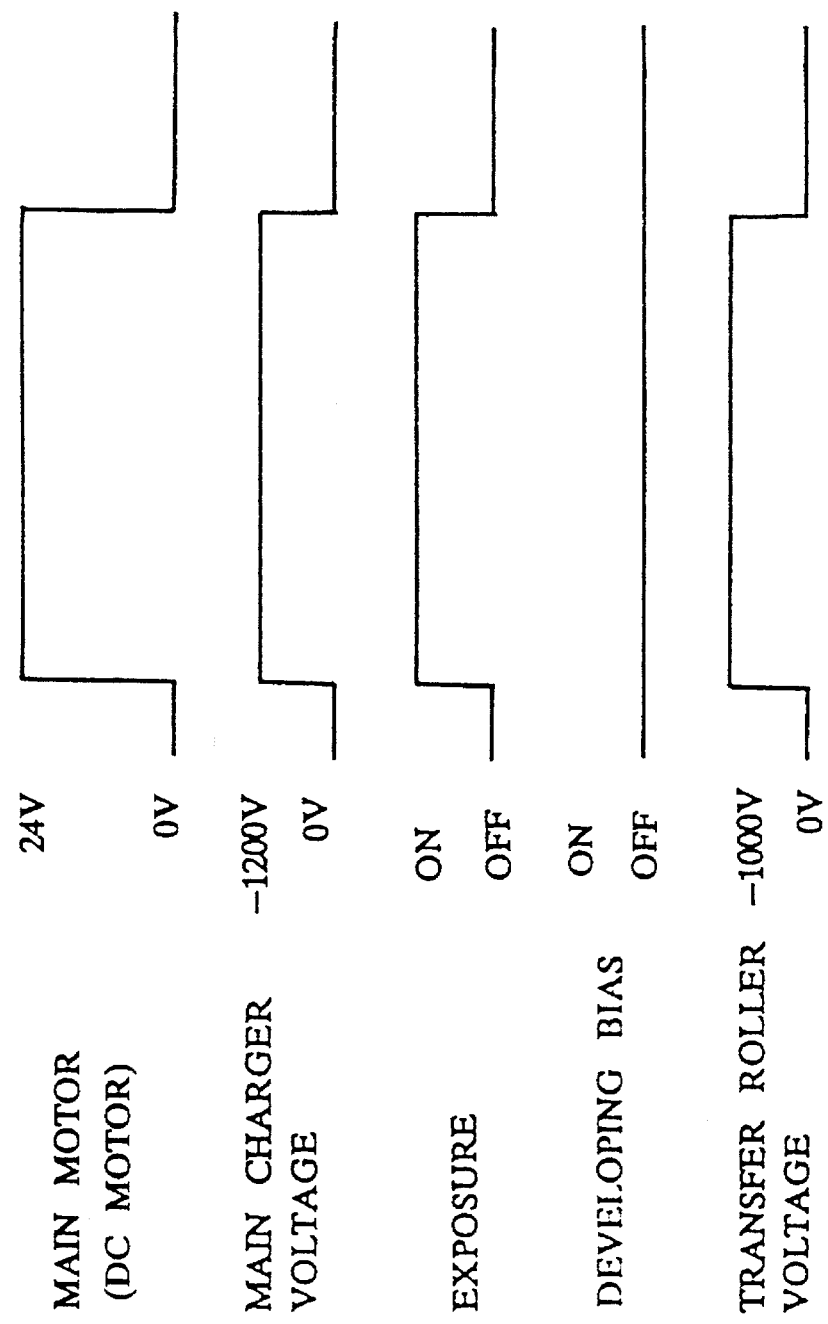
FIG. 11 is a timing chart showing timings when the control circuit performs cleaning processing at a higher speed of rotation of a main motor.

Meanwhile, the cleaning time can be decreased by increasing the speed of the driving system. In particular, in the image forming apparatus of the first embodiment, the main motor is a DC motor and is energized with 12 V, and the speed of rotation of the motor is raised by raising the energizing voltage. FIG. 11 is a timing chart when the main motor is energized with 24 V to perform cleaning processing at a higher speed. In this instance, the cleaning time is reduced to one half comparing with that when the main motor is energized with 12 V (refer to FIG. 3). On the other hand, where the main motor is a stepping motor, the cleaning time can be reduced by changing the driving pulses to raise the speed of rotation of the main motor.

Figure 12:
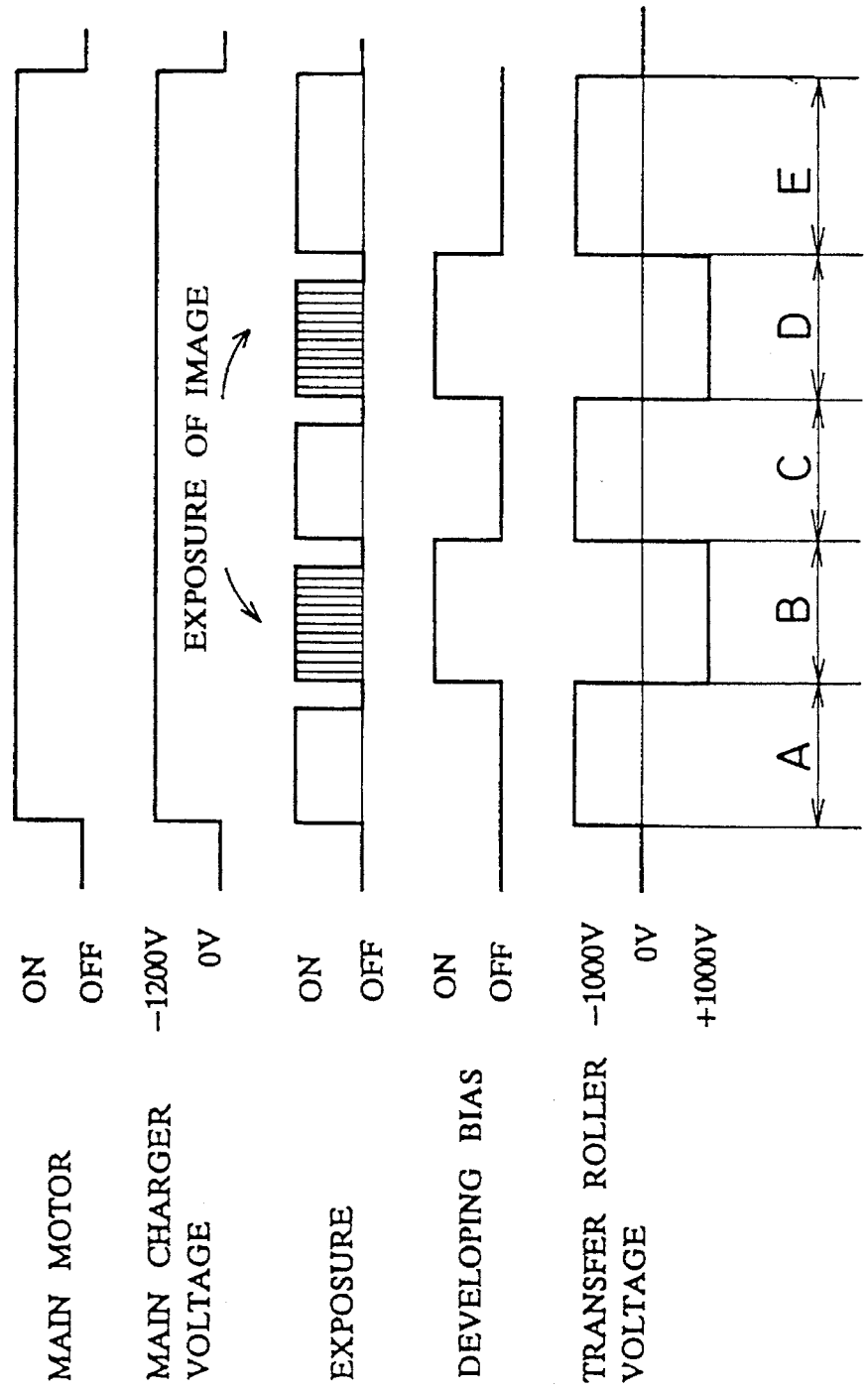
FIG. 12 is a timing chart illustrating another example of printing processing including cleaning processing.

Further, as described hereinabove in connection with the conventional image forming apparatus, in an image forming apparatus in which processing for cleaning the transfer roller 7 for each formation of an image by regular printing processing is incorporated, when it is determined that the image size does not coincide with the recording paper size, cleaning of the transfer roller 7 can be performed with a higher degree of certainty if cleaning processing is performed for a longer period of time than regular cleaning processing. FIG. 12 is a timing chart illustrating timings of cleaning processing in this case. The portions A to E are similar to those described hereinabove with reference to FIG. 10.

As described above, with the image forming apparatus of the first embodiment, when comparison between the size of an image to be formed on an image carrier and the size of a recording medium detected by detection means proves that the two sizes are different from each other such as, for example, the image size is greater than the recording medium size, a transfer rotary member may be soiled by toner, and accordingly, only in this instance, cleaning means is rendered operative to remove the toner from the transfer rotary member. Consequently, the number of times by which the cleaning means is rendered operative can be reduced comparing with that of the case wherein the transfer rotary member is cleaned every time an image is formed as in conventional image forming apparatus. Accordingly, the time required for formation of an image can be reduced and the life of the components such as a developing unit or a driving mechanism can be extended.

Subsequently, an image forming apparatus of a second preferred embodiment of the present embodiment will be described. In the image forming apparatus of the first embodiment described above, when the image size does not coincide with the recording paper size, cleaning processing for the transfer roller is performed and a printing operation is interrupted. In the image forming apparatus of the second embodiment, however, when a predetermined interval of time passes or the size of an image is modified, or else sheets of recording paper are replaced after interruption of a printing operation, the image forming apparatus automatically returns to a printing operation waiting condition. This is very effective processing when a plurality of host computers are connected to the printer controller.

Figure 13:
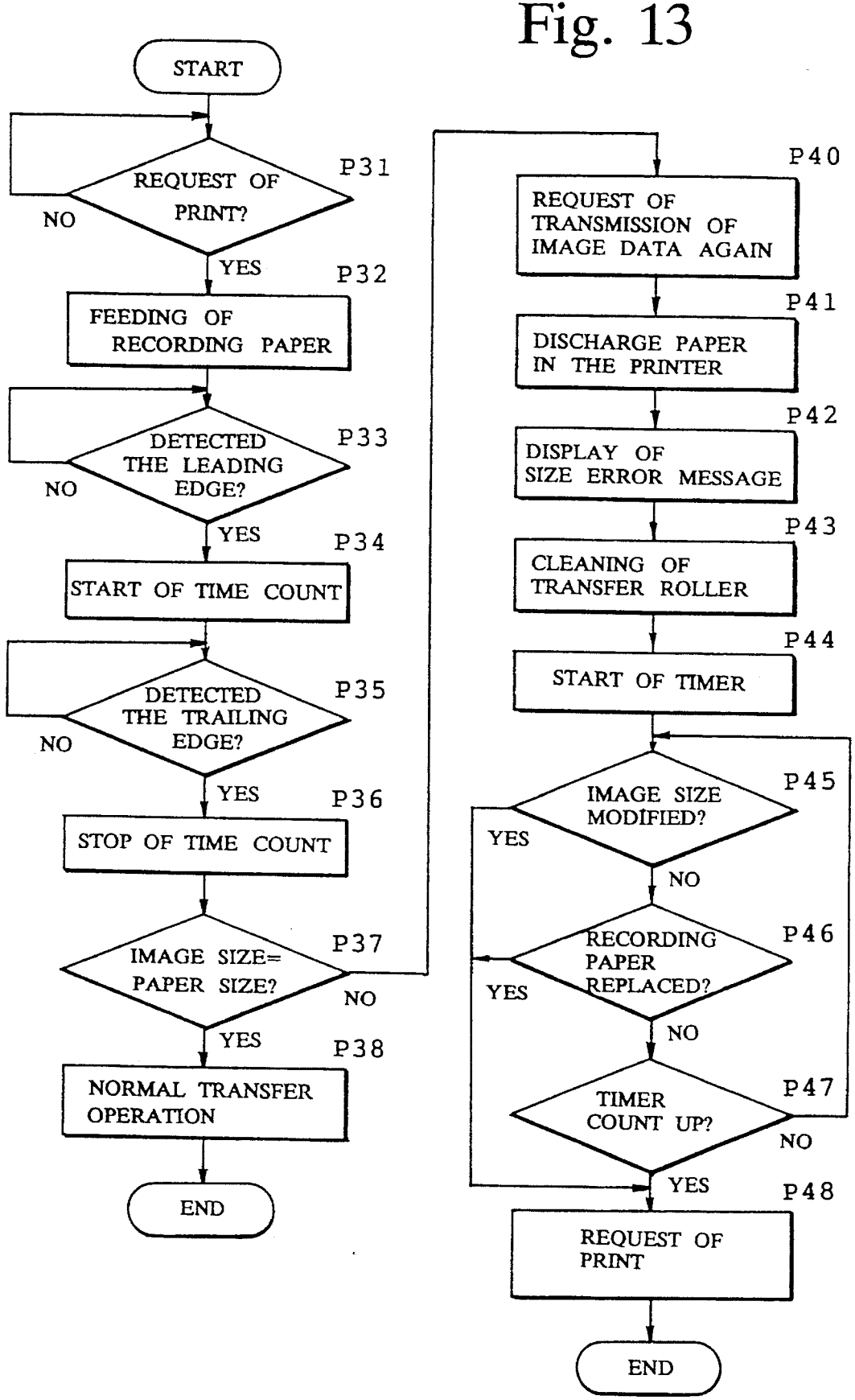
FIG. 13 is a flow chart illustrating a second example of determination of the size of recording paper and cleaning processing of the transfer roller executed by the control circuit.

FIG. 13 is a flow chart illustrating processing of determination of the recording paper size executed by the printer controller 22 of the image forming apparatus, cleaning processing of the transfer roller when the image size does not coincide with the recording paper size and returning to a printing operation interrupted when the image size does not coincide with the recording paper size.

Of the flow chart of FIG. 13, the steps P13 to P43 indicate the processing of determination of the recording paper size and the cleaning processing when the image size does not coincide with the recording paper size. Since the processing is similar to the processing at steps P1 to P13 of the flow chart of the image forming apparatus of the first embodiment illustrated in FIG. 6, description of the processing is omitted here, and description will be given the returning processing to a printing operation at steps beginning with the step P44.

At steps P31 to P43, determination of the recording paper size is performed, and then when the image size does not coincide with the recording paper size, a printing operation is interrupted and discharging of recording paper in the printer and display of a size error message are performed, whereafter cleaning processing for the transfer roller is performed.

Thereafter, the control sequence advances to the returning processing to the interrupted printing operation. First, counting of a predetermined interval of time is started by means of a timer (step P44). The counting operation is performed so that, where a single printer is utilized as an output apparatus for a plurality of host computers, after a predetermined interval of time elapses after the interruption of a printing operation, the printer may automatically be returned to a printing operation waiting condition as a printer for another one of the host computers. It is determined whether or not the operator, looking at the display of a size error message, modifies the image size by inputting a new image size by way of the operation panel (step P45), and when the image size is modified, the control sequence advances to step P48, at which a printing request is developed, whereafter the printer controller 22 returns to the printing operation waiting condition.

If it is determined at step P46 that no replacement of recording paper has been performed, an end of counting of the predetermined interval of time by the timer is detected (step P47), and when an end of counting is reached, the printer controller 22 returns to the printing operation waiting condition. In this instance, the image size should be adjusted based on the recording paper size detected as a result of the processing at steps P33 to P36 so that, when a printing operation is re-started, a size error may not occur again. The adjustment of the image size may be performed using any of several methods including expansion or reduction of an image or omission of a portion of an image which protrudes from the recording paper size.

While the returning processing to a printing operation described above is constructed such that the printer controller 22 automatically returns to a printing operation waiting condition when one of inputting of a new image size by way of the operation panel, setting of recording papers conforming to the image size or lapse of the predetermined interval of time is determined, alternatively one of several conditions may be selected on the operation panel or a host computer by the operator.

Figure 14:
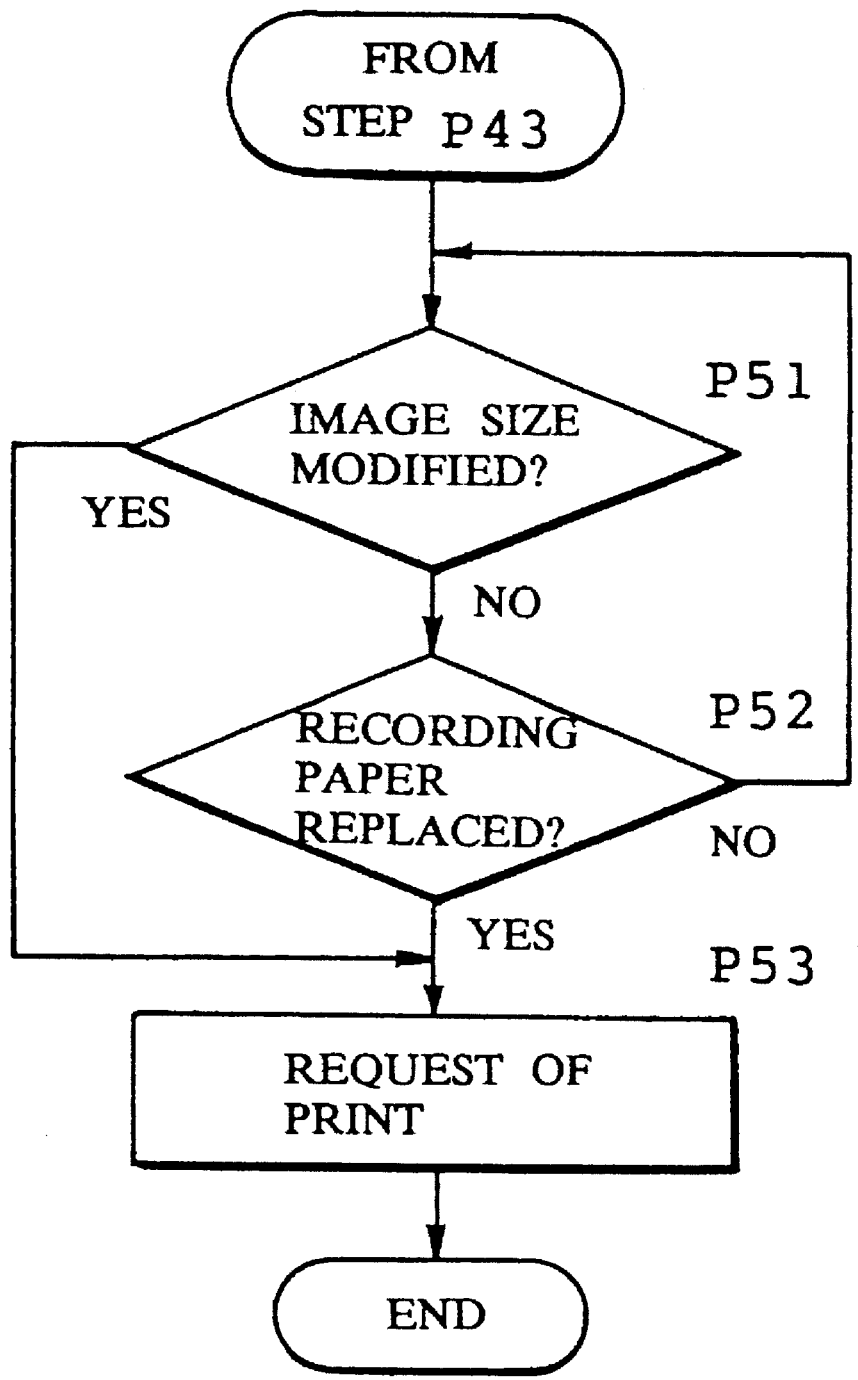
FIG. 14 is a flow chart showing a modification to the flow chart illustrated in FIG. 13.

Further, the returning processing to a printing operation described above is processing where a plurality of host computers are connected. On the other hand, where a single host computer is connected, since there is no need of waiting lapse of the predetermined time before the printer returns to a printing operation waiting condition, the processing at steps beginning with step P44 of the flow chart of FIG. 13 may be modified to such processing as illustrated at steps P51 to P53 of the flow chart of FIG. 14.

Subsequently, a third embodiment of the present invention will be described. While, in the image forming apparatus of the first embodiment described above, cleaning processing for the transfer roller is performed for a fixed period of time when the image size does not coincide with the recording paper size, in the image forming apparatus of the present third embodiment, the cleaning time for the transfer roller is determined in accordance with the magnitude of an area of an image which protrudes from recording paper. Consequently, not only the cleaning time can be reduced to a minimum necessary value thereby to elongate the life of the cleaning mechanism, but also the time required to return the apparatus to a recording enabled condition can be minimized.

Figure 15:
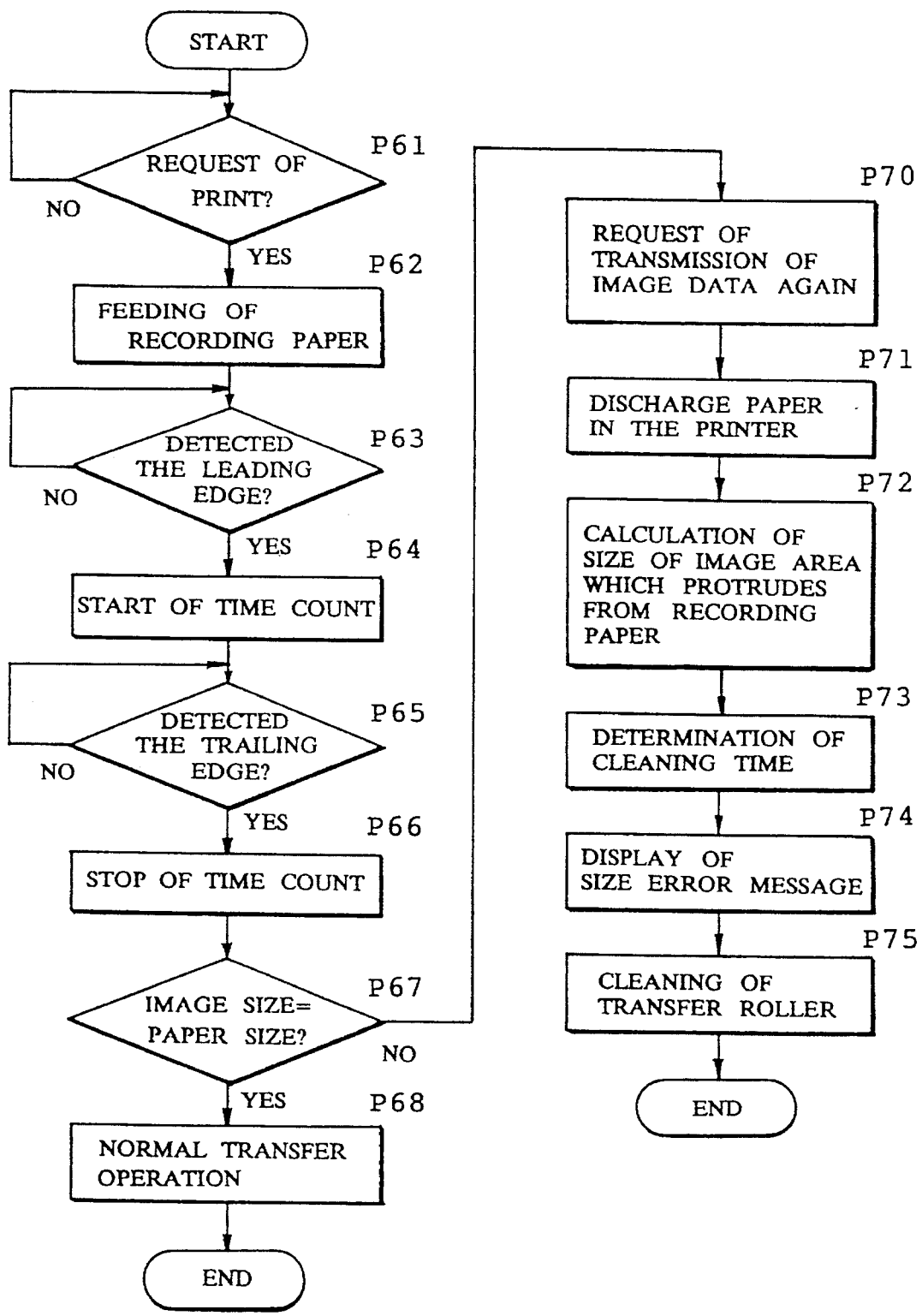
FIG. 15 is a flow chart illustrating a third example of determination of the size of recording paper and cleaning processing of the transfer roller executed by the control circuit.

FIG. 15 is a flow chart illustrating processing of determination of the recording paper size performed by the printer controller 22 of the image forming apparatus of the third embodiment, calculation of a cleaning time for the transfer roller when the image size does not coincide with the recording paper size, and cleaning of the transfer roller.

Of the flow chart shown in FIG. 15, the steps P61 to P71 represent the processing of determination of the recording paper size and stopping of a printing operation and discharging of recording paper in the printer when the image size does not coincide with the recording paper size. Since the processing at steps P61 to P71 is the same as that at steps P1 to P11 of the flow chart of the image forming apparatus of the first embodiment shown in FIG. 6, description thereof is omitted herein, and only the processing of calculation of a cleaning time for the transfer roller and cleaning of the transfer roller at steps beginning with step P72 will be described.

At steps P61 to P71, processing of determination of the recording paper size and stopping of a printing operation and discharging of recording paper in the printer when the image size does not coincide with the recording paper size is executed.

Figure 16:
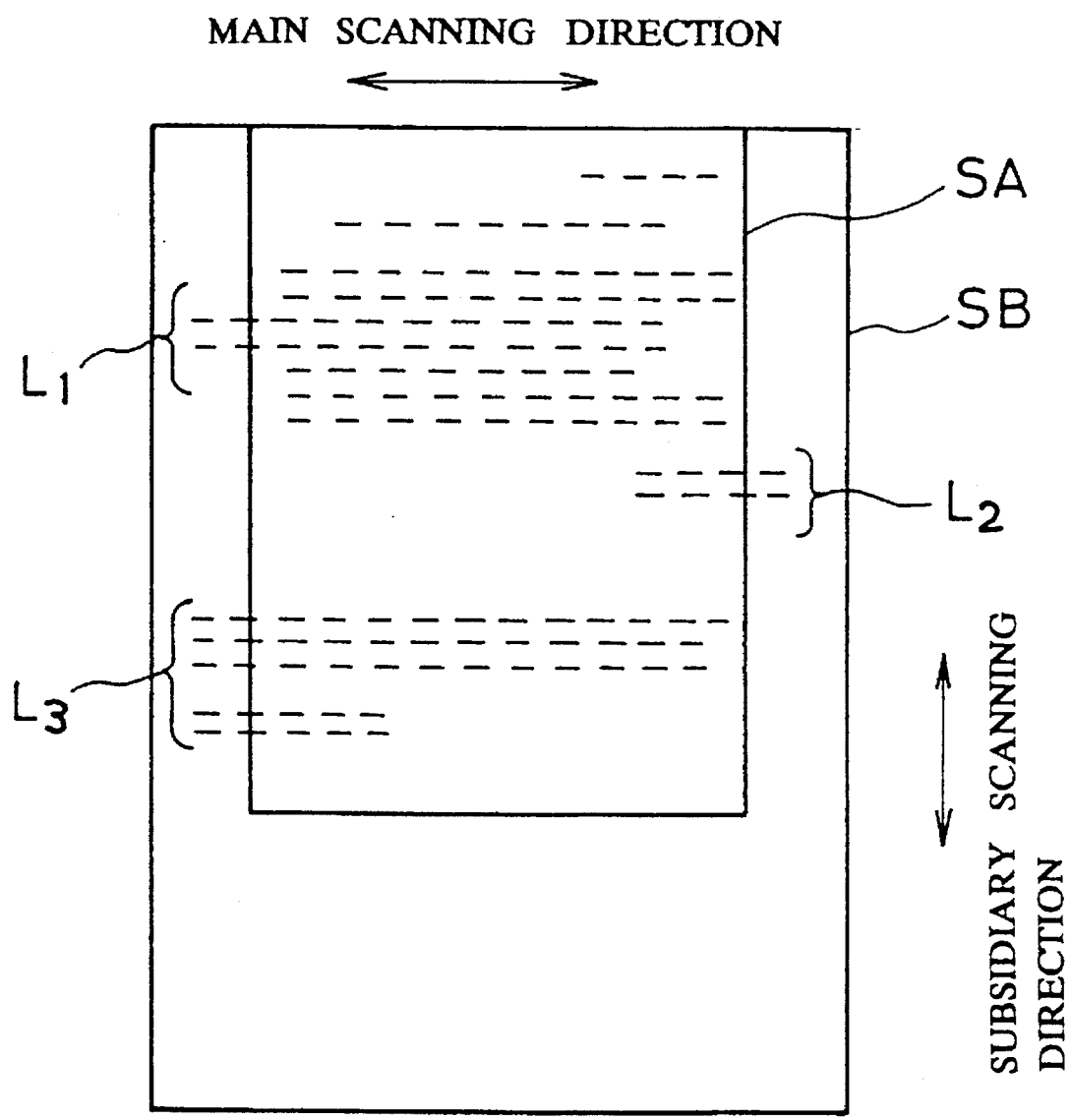
FIG. 16 is a diagrammatic view illustrating the relationship among the image size, the recording paper size and scanning lines in the third example.

Subsequently, the size of an area of an image which protrudes from the recording paper size is calculated (step P72). Since information of the recording paper size has been obtained by the processing at steps P63 to P66, the printer controller 22 calculates the number of dots or the number of lines included in the area of the image which protrudes from the recording paper size and determines the thus calculated number as the magnitude of the protruding image area. FIG. 16 is a diagrammatic view illustrating the relationship of the image size to the recording paper size and scanning lines, and in FIG. 16, each broken line represents a string of recorded characters. The recording paper size SA is smaller than the image size SB, and the recorded character strings L1, L2 and L3 are recording character strings which protrude from the recording paper size SA. Here, the magnitude of the protruding recorded character strings of the image is determined by counting the number of main scanning lines constituting the recorded character strings based on the addresses of the protruding area in the image memory.

After the magnitude of the protruding image area is calculated, the cleaning time corresponding to the magnitude is determined (step P73). The cleaning time may be determined in a continuous value or may be determined stepwise from a plurality of periods of time set for a plurality of stages into which the magnitude of the image area is divided. Or else, the cleaning time may be determined as a number (one or more) of rotations of the transfer roller.

Then, in order to remove toner sticking to the transfer roller 7, a size error message is displayed to give a warning to the operator that the image size does not coincide with the recording paper size (step P74), and then, cleaning processing wherein a potential lower than the potential applied to the photosensitive drum 1 is applied to the transfer roller 7 to transfer the toner on the transfer roller 7 to the photosensitive drum 1 (step P75). It is to be noted that the unnecessary toner transferred to the photosensitive drum 1 then is removed by ordinary cleaning processing for the photosensitive drum 1 by the cleaning blade 8.

Subsequently, a fourth embodiment of the present invention will be described. The image forming apparatus of the present embodiment is constructed such that, even if the image size is larger than the recording paper size and the image partially protrudes from recording paper, the image is printed compulsorily ignoring the protruding image area. In the image forming apparatus of the present embodiment, image data corresponding to the protruding image area is erased from the image memory so that a toner image of the protruding image area may not be formed on the photosensitive member in the image forming process thereby to minimize the number of cleaning operations for the transfer roller, which elongates the life of the cleaning mechanism.

First, construction of the printer controller 22 of the laser printer of the fourth embodiment will be described with reference to FIG. 17.

The printer controller 22 shown includes a host computer interface 35 and an engine interface 36 for communicating information with the host computer 21A and the engine controller 24, respectively. A program memory (ROM) 37 stores therein a program in accordance with which a CPU 38 operates to execute control of the printer controller 22.

A working memory 39 has a function of temporarily storing therein working information of the printer controller 22 when necessary. A receiving data storing memory 40 serves as a buffer for receiving and storing data from the host computer 21A, and image data read into the printer controller 22 are stored into the memory 40. An intermediate data storing memory 41 analyzes and converts reception data in the receiving data storing memory 40 into intermediate codes and stores the intermediate codes. Accordingly, image data are stored as intermediate codes in the intermediate data storing memory 41. A bit image storing memory 42 stores a bit image into which intermediate data in the intermediate data storing memory 41 are developed. A DMA circuit 43 has a function of outputting bit data of the bit image storing memory 42 to the engine controller 24 by way of the engine interface 36.

With the laser printer controller 22 shown in FIG. 17, when the recording paper size is smaller than the size of an image read in, image clipping, whose detailed operation is illustrated in a flow chart which will be hereinafter described, is performed on condition of an instruction of compulsory printing.

Subsequently, general operation of the laser printer of the fourth embodiment will be described before detailed operation of it is described.

Image data read in by means of an image scanner or a like apparatus not shown, data regarding the size of the image and some other data are transmitted from any of the host computers 21A to 21C to the printer controller 22. When a print request signal is outputted from any of the host computers 21A to 21C or the operation panel 23, the paper feeding controller 25 operates to feed out recording paper CP from a designated paper supply port. The size of the recording paper is recognized at a point of time when the trailing edge of it is detected by the paper feed sensor 10 as described hereinabove, and the size of the thus recognized recording paper and the size of the image are compared with each other by the printer controller 22. When the recording paper size is smaller than the image size received from the host computer 21, if an instruction of compulsory printing to still continue printing processing is received, then bit data of a peripheral portion of the image which is to protrude from the recording paper are erased so that the protruding peripheral portion of the image may not be formed as a latent image on the photosensitive drum. This processing is performed by the CPU 38, the bit image storing memory 42 and the DMA circuit 43 in the printer controller 22.

Figure 18A:
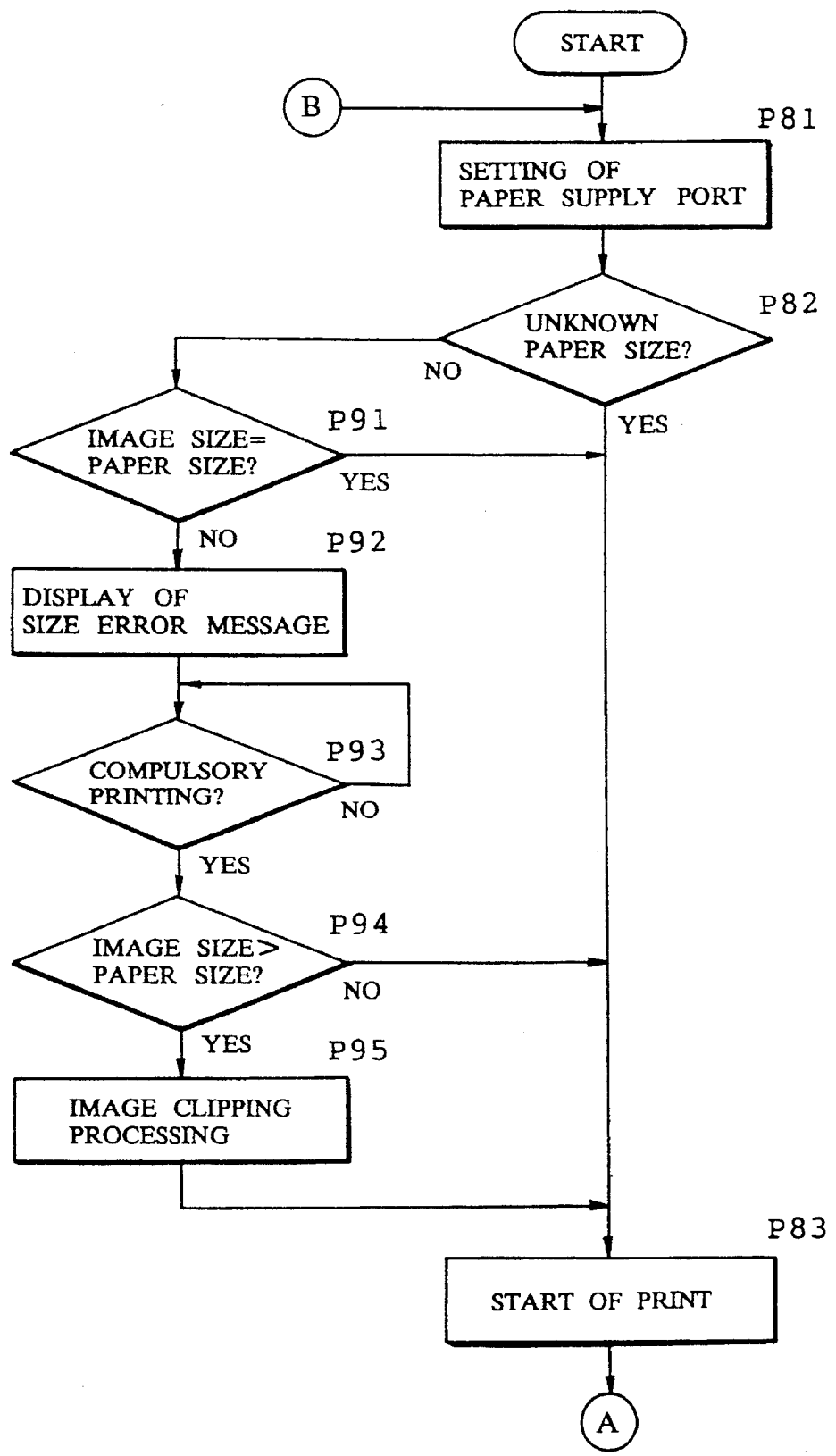
FIGS. 18(a) and 18(b) are flow charts illustrating determination of the size of recording paper and cleaning of the transfer roller executed by the control circuit of FIG. 17.
Figure 18B:
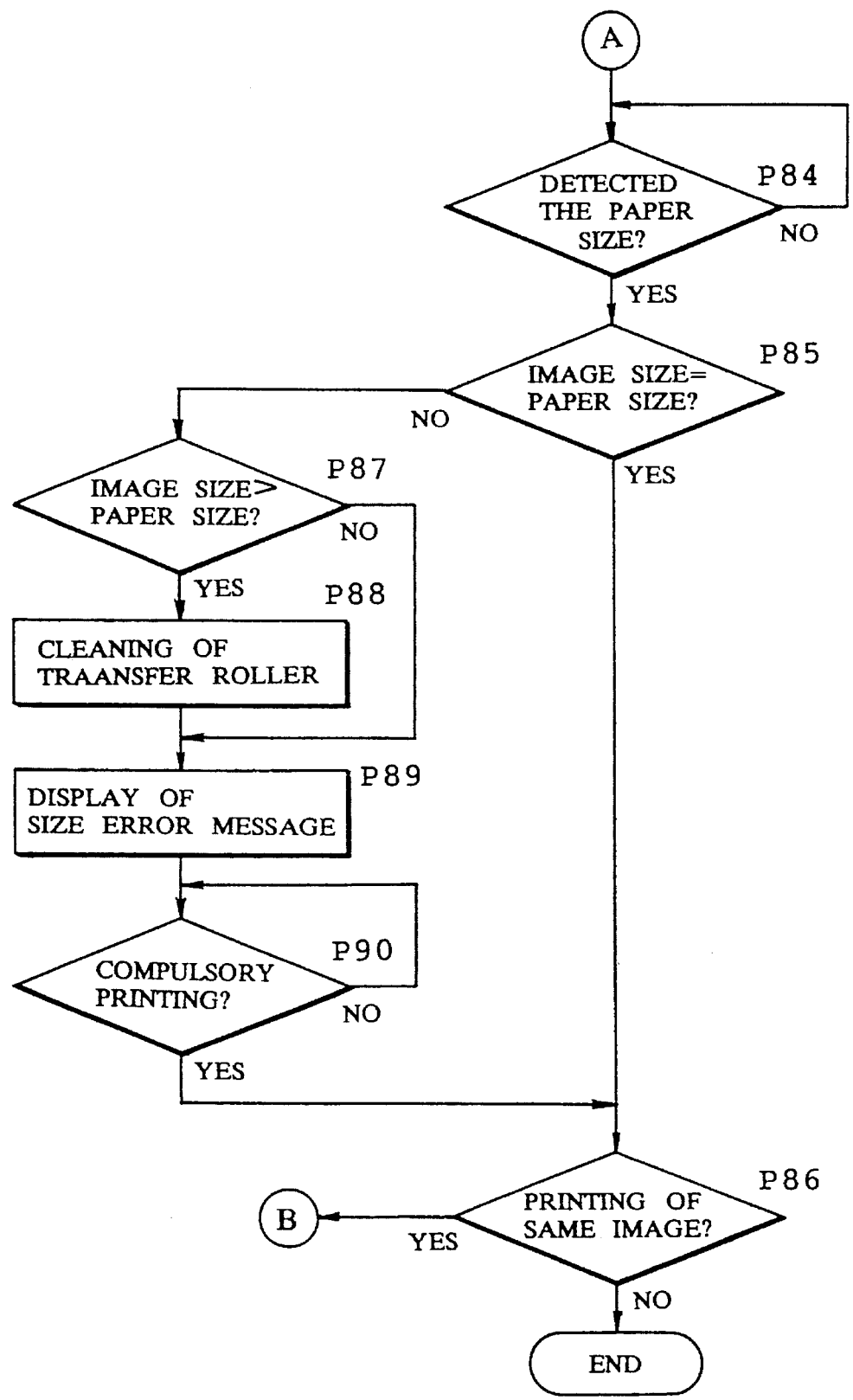

The operation described above will be described in more detail below with reference to the flow charts of FIGS. 18(a), 18(b) and 19 in which controlling operation of the printer controller 22 is illustrated. Here, it is assumed that, before the processing of the flow charts is executed, image data are received from any of the host computers 21A to 21C and are stored as intermediate data in the intermediate data storing memory 41 or as bit data in the bit image storing memory 42. It is further assumed that also data regarding the size of the image has been received from the host computer 21A to 21C.

First, the printer controller 22 outputs, in response to a signal regarding setting of a paper supply port received from the operation panel 23 or any of the host computers 21A to 21C, a signal to the paper feeding controller 25 to set a designated paper supply port. The paper feeding controller 25 selects one of paper supply ports in response to the signal received from the printer controller 22 (step P81). In this instance, if the size of recording paper to be supplied has not been recognized by the printer controller 22, then after a print request signal is outputted from the operation panel 23 or any of the host computers 21A to 21C, an instruction to print is outputted from the printer controller 22 to the engine controller 24. In response to the instruction, the engine controller 24 renders the paper feeding controller 25 operative, and consequently, the paper feed roller 9 is rotated to start feeding of recording paper (steps P82 and P83).

After feeding of recording paper is started, the printer controller 22 waits that the size of the recording paper thus supplied is recognized. In short, the printer controller 22 waits until after the trailing edge of the recording paper is detected by the paper feed sensor 10. In this instance, the size of the recording paper thus detected may be treated as a maximum size (step P84). Subsequently, the printer controller 22 compares the size of the recording paper thus detected with the known size of the image stored as data therein, and if the size of the image and the size of the recording paper are equal to each other, then the control sequence returns to step P81 on condition that printing of the same image is required, but if printing of the same image is not required, the printing processing is ended (steps P85 and P86).

When printing is performed while the size of the recording paper is unknown in this manner, printing of the image onto the recording paper is performed on condition that the size of the recording paper is recognized and the size of the image and the size of the recording paper coincide with each other.

On the other hand, when it is determined at steps P85 that the size of the image and the size of the recording paper do not coincide with each other, on condition that the size of the image is larger than the size of the recording paper (step P87), the printer controller 22 delivers an instruction to the engine controller 24 to perform cleaning of removing toner sticking to the transfer roller 7 (step P88). The reason why such cleaning is performed is that, otherwise if the size of the recording paper supplied is smaller than the size of the image, not only an incomplete image which is partially lost is formed on the recording paper, but also the toner which has formed the lost part of the image sticks directly to the transfer roller 7 and causes soiling to another sheet of recording paper to be supplied subsequently. When the size of the recording paper supplied is larger than the size of the image, such disadvantage does not occur, and consequently, the cleaning operation described above is not performed.

After the processing described above is completed, the printer controller 22 performs a display that the size of the image does not coincide with the size of the recording paper, that is, a display of a size error message to call for attention of the operator (step P89), and then waits for an instruction of compulsory printing to print the image even if the size of the image is larger than the size of the recording paper (step P90). The instruction of compulsory printing is outputted from the operation panel 23 or one of the host computers 21A to 21C.

In this manner, when the size of the image does not coincide with the size of the recording paper, cleaning processing and an error display are performed on condition that the size of the image is larger than the size of the recording paper. On the other hand, when the size of the image is smaller than the recording paper, only an error message display is performed.

When the size of the recording paper is recognized at step P82, the printer controller 22 compares the thus detected size of the recording paper with the known size of the image stored as data therein (step P91), and then if the size of the image and the size of the recording paper are equal to each other, the control sequence returns to step P83, at which the printing processing described above is performed. But if the size of the image and the size of the recording paper are not equal to each other, a display that the size of the image does not coincide with the size of the recording paper, that is, a display of a size error message, is performed to call for attention of the operator, and the printer controller 22 waits for an instruction of compulsory printing (steps P92 and P93).

If an instruction of compulsory printing is received from any of the host computers 21A to 21C or the operation panel 34, then if the size of the image is smaller than the size of the recording paper, then the printer controller 22 returns the control sequence to step P83, at which the printing processing described above is performed. But if the size of the image is larger than the size of the recording paper, then the image clipping processing to erase image data of a peripheral portion of the image protruding from the recording paper is performed (steps P94 and P95). Thereafter, the control sequence returns to step P83, at which the printing operation described above is performed.

Figure 19:
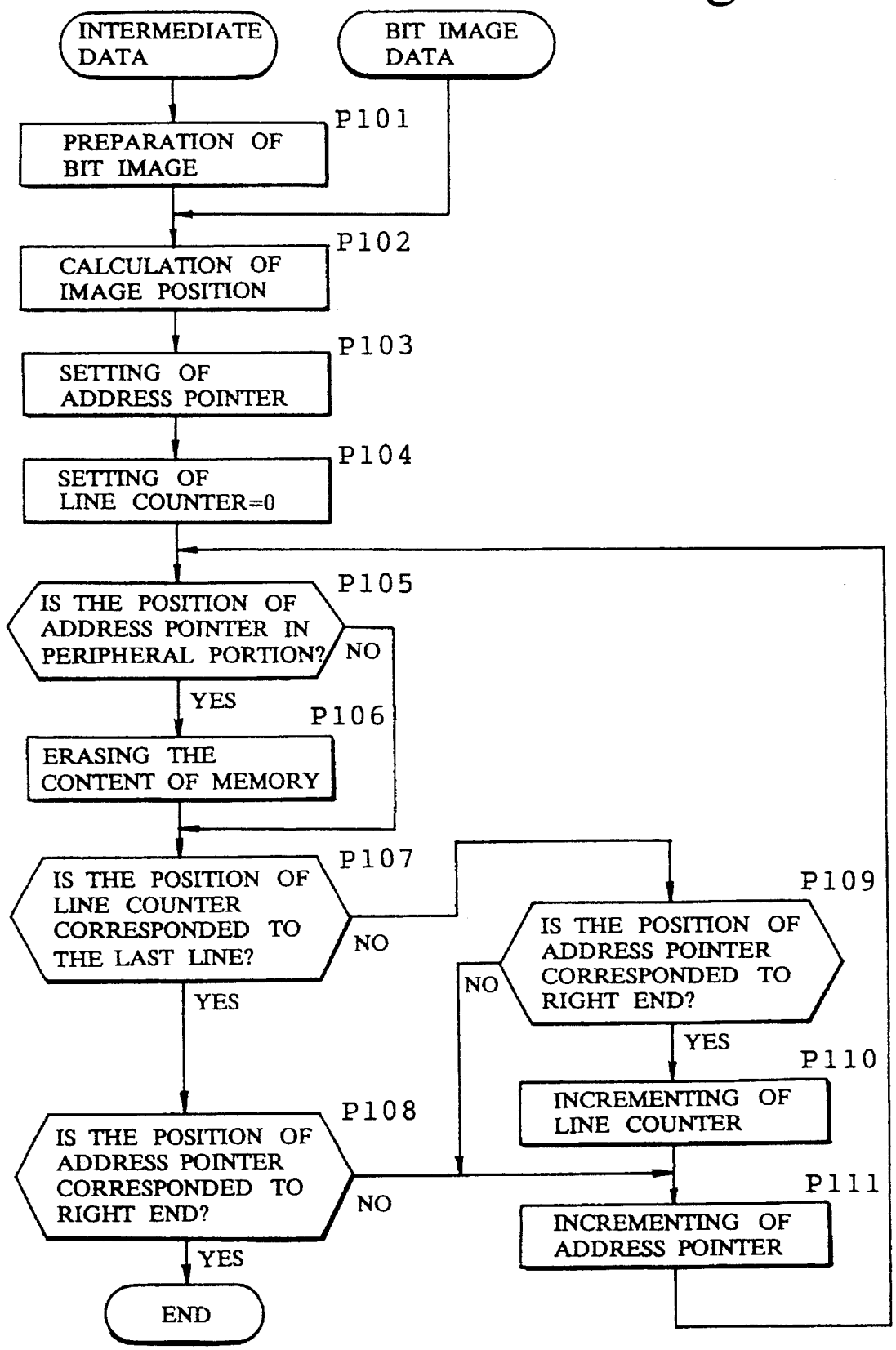
FIG. 19 is a flow chart illustrating details of image clipping processing of the flow chart illustrated in FIG. 18.

FIG. 19 is a flow chart of a subroutine illustrating detailed processing of the image clipping processing described above. Also the processing of the flow chart is executed by the printer controller 22.

Figure 17:
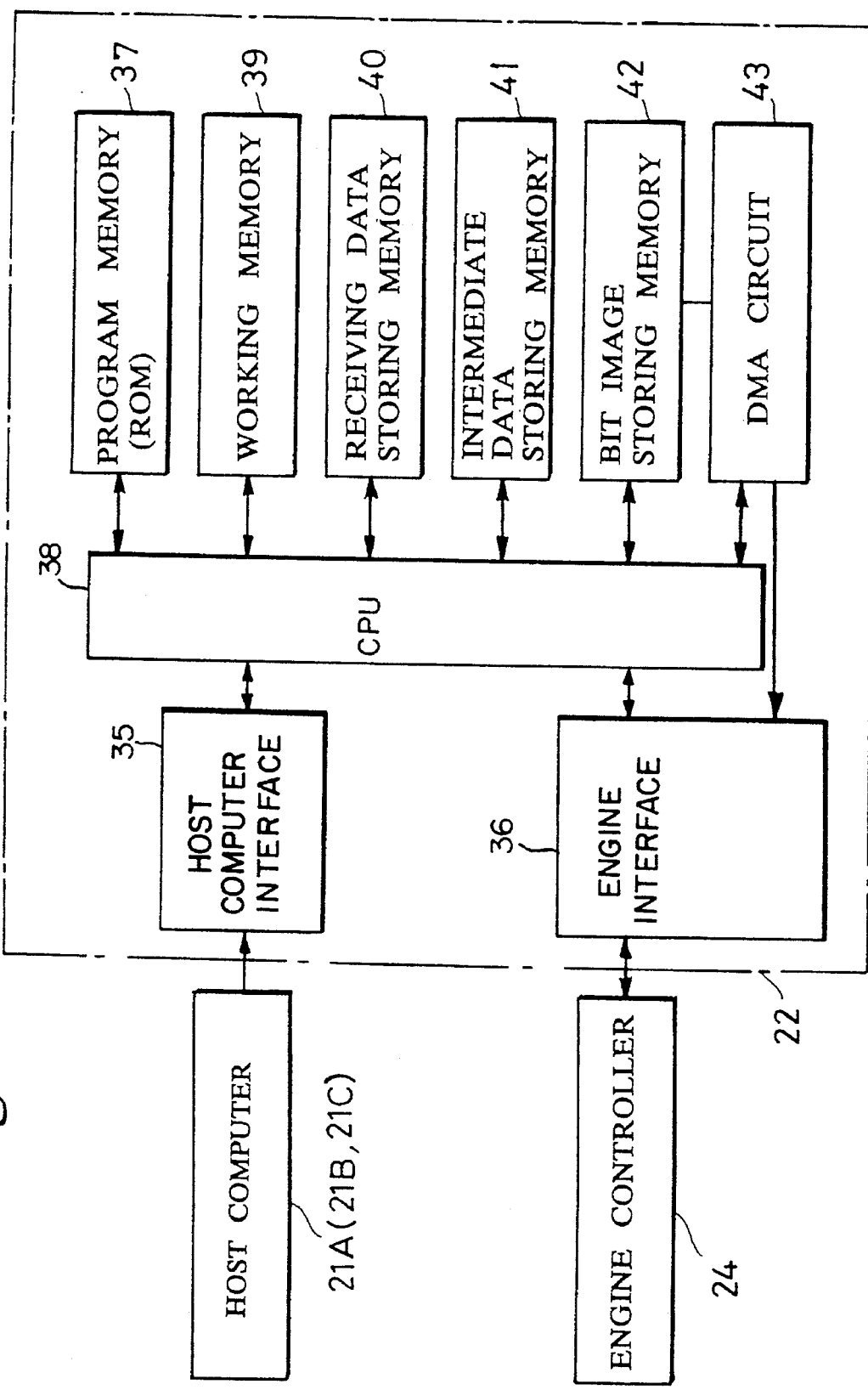
FIG. 17 is a circuit block diagram showing construction of another printer controller.

First, where the laser printer is constructed such that image data received from any of the host computers 21A to 21C are stored as intermediate data, since the image data are stored in the intermediate data storing memory 41 shown in FIG. 17, the intermediate data are converted into a bit image by the CPU 38 and stored into the bit image storing memory 42. It is to be noted that, where such bit image is provided from the beginning, no such conversion as described just above is required (step P101). Subsequently, the CPU 38 calculates the address of a location at the left upper corner of the image. In short, the CPU 38 calculates the position of the origin of the image data (step P102). Then, the CPU 38 sets its address pointer to the position of the origin at the left upper corner and sets a line counter thereof to zero (steps P103 and P104). Thereafter, the bit data stored in the bit image storing memory 42 are successively read out in response to the address pointer and the line counter thus set. Upon such reading out, when the position of the address pointer is at a peripheral portion of the image, that is, a portion of the image which protrudes from the recording paper, since the data there is unnecessary data, processing of erasing the contents of the memory indicated by the address pointer is performed (steps P105 and P106). Subsequently, it is determined whether or not the position indicated by the line counter corresponds to the last line, and if the position is the last line, then it is determined whether or not the position indicated by the address counter corresponds to the right end. Then, if the position of the address counter is the right end, then processing is ended. This is because, when the position of the line counter is the last line and the position of the address counter is the right end, this means that reading out of all of the bit data of the image data has been completed (steps P107 and P108). On the other hand, if the position of the line counter is not the last line, then it is determined whether or not the position indicated by the address pointer corresponds to the right end, and if the position is the right end, then the line counter is incremented and the address pointer is incremented. If the position of the address pointer is not the right end, then the line counter is left as it is while only the address pointer is incremented. The processing described above successively scans the image data for each line and for each one bit (steps P109 to P111). As a result of the processing described above, the data of the portion of the image in the area outside the size of the recording paper are erased.

As described so far, with the laser printer of the fourth embodiment, since all of image data in an area of an image which is to be printed outside recording paper are erased when the size of the image is larger than the size of the recording paper, even when a large image is compulsorily printed onto smaller recording paper, the number of cleaning operations can be minimized. Consequently, enhancement of the life of the components, reduction in printing time and reduction of scrapped toner can be achieved. Such processing is particularly effective when images whose size increases as the page proceeds are to be printed.

Subsequently, trouble processing in the laser printer of the present invention will be described. When, from among various troubles which may possibly occur when recording paper is fed by the feeding means, a picking up error occurs, that is, the feeding means fails to send out recording paper from a supply paper cassette, it can be determined at an initial stage of an image forming process that a picking up error has occurred, and consequently, either formation of a toner image onto the photosensitive member is interrupted quickly or no toner image is formed. As a result, the cleaning processing for the transfer roller can be completed within a short period of time. Consequently, the cleaning time can be reduced, and an image forming operation can be restored quickly.

The trouble processing of the laser printer described below is processed in the inside of the printer controller 22 of the laser printer shown in FIG. 2.

Figure 20:
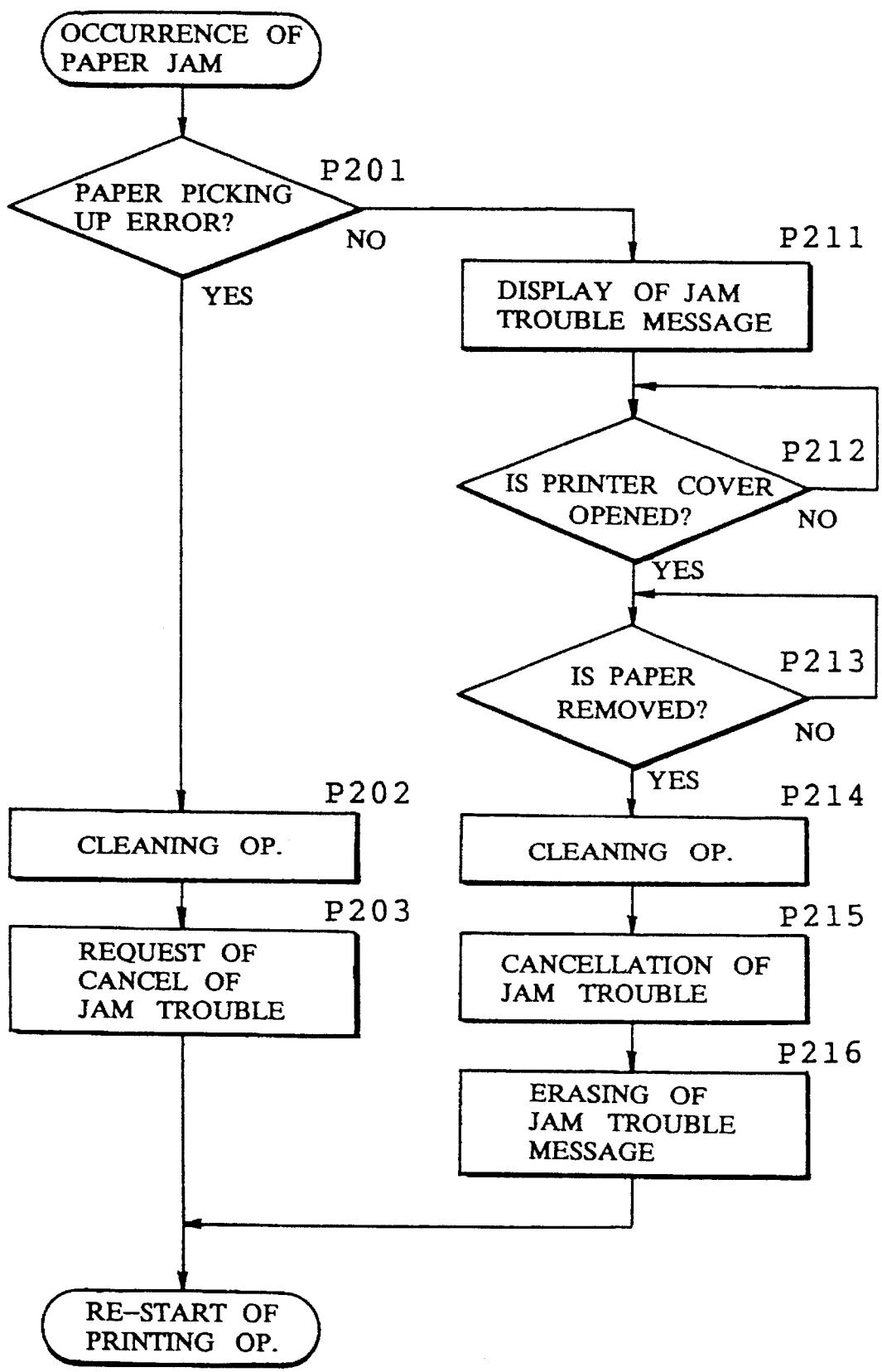
FIG. 20 is a flow chart illustrating trouble processing.

FIG. 20 is a flow chart illustrating the trouble processing operation executed by the printer controller 22.

When a trouble occurs, the printer controller 22 determines whether or not the trouble is a picking up error of recording paper (step P201). The printer controller 22 determines, based on the condition of the output of the paper feed sensor 10 inputted from the engine controller 24, whether or not the trouble is a picking up error. In particular, the printer controller 22 determines that the trouble is a picking up error if the paper feed sensor 10 is not switched on within the predetermined period of time although a paper feeding operation for recording paper has been started by rotation of the paper feed roller 9.

When the trouble is a picking up error, the printer controller 22 delivers a cleaning instruction to the engine controller 24 (step P202). This is because, when the trouble is a picking up error, no recording paper is present in the apparatus and consequently the image forming mechanism will not be damaged at all even if the cleaning processing is executed then.

When the cleaning instruction is received from the printer controller 22, the engine controller 24 renders the high voltage controller 29 operative to apply a potential of the opposite polarity to that for transfer to the transfer roller 7 so that toner sticking to the transfer roller 7 is transferred to the photosensitive drum 1. The engine controller 24 causes the processing to be performed by at least one rotation of the transfer roller 7. The unnecessary toner transferred to the photosensitive drum 1 is removed by ordinary cleaning processing for the photosensitive drum 1 by the cleaning blade 8.

The cleaning operation then is performed within a shorter period of time than that of cleaning operation required from any other trouble. This is because, since a picking up error can be detected at an early stage of image formation and writing onto the photosensitive member by a laser beam is performed little, also the cleaning time can be short accordingly. Further, if a picking up error is detected at a sufficiently early stage, no cleaning need be performed.

Further, the cleaning operation then does not require opening or closing of a cover. In particular, when one of ordinary troubles occurs, it is necessary to remove recording paper from the apparatus, which involves an operation of opening and closing the cover for the engine. However, when a picking up error occurs, since no recording paper is present in the apparatus, an operation of opening and closing the cover for removing recording paper is not required. In this manner, when a picking up error occurs, cleaning is performed without performing an opening or closing operation of the cover, and consequently, the operator need not perform an unnecessary operation.

Further, since a switching on/off operation for the power supply involved in an opening/closing operation of the cover is unnecessary, restoration from the troubled condition can be performed rapidly.

After cleaning of the transfer roller 7 is completed, the printer controller 22 outputs a trouble cancellation request to the engine controller 24 (step P203). Upon reception of the request, the engine controller 24 re-starts the control sections 25 and 28 to 30 under predetermined operation conditions to re-start a printing operation.

When it is determined at step P201 that the trouble is not a picking up error, the printer controller 22 controls the operation panel 23 to make a display of a jam trouble message that a paper jam trouble has occurred in order to call for attention of the operator and request cancellation of a cause of the jam trouble (step P211). If the cover of the laser printer is opened and recording paper which has not been fed appropriately is removed (steps P212 and P213), then the controller 22 outputs an instruction to the engine controller 24 to perform cleaning of removing toner adhering to the transfer roller 7 (step P214). In response to the instruction, the engine controller 24 performs cleaning processing for the transfer roller 7 in a similar manner as described hereinabove.

After the cleaning operation for the transfer roller 7 is completed, the printer controller 22 outputs an instruction to the engine controller 24 to cancel the jam trouble (step P215) and erases the display of a jam trouble message on the operation panel 23 (step P216). Upon reception of the trouble cancellation instruction, the engine controller 24 re-starts the control sections 25 and 28 to 30 under predetermined operation conditions to resume a printing operation.

When incomplete feeding of recording paper by the feeding means, that is, a jam trouble, occurs, if the jam trouble is a picking up error of a paper sheet, then the laser printer performs cleaning without requiring opening or closing movement of the cover or a cleaning operation is performed but in a short period of time or is not performed. Consequently, the laser printer can rapidly restore itself from the troubled condition.

As described so far, according to the present invention, when the size of a toner image formed on a photosensitive member does not coincide with the size of a recording medium, an image forming operation is interrupted, and cleaning means is rendered operative to remove toner from a transfer rotary member. In this instance, presence or absence of an image area protruding from the recording medium, and the size when such image area is present, are determined from the image size and the recording medium size, and the number of operations and the operation time of the cleaning means are controlled in accordance with a result of the determination. Consequently, comparing with an alternative apparatus wherein cleaning is performed every time an image is formed as in the conventional apparatus, the number of times and the time required to operate the cleaning means can be reduced, and as a result, the time required for formation of an image can be reduced.

Further, when an image area which protrudes from the recording medium is present, if the image size is changed or recording media are replaced with those of an optimum size, an image forming operation can be resumed automatically. Consequently, an image forming operation can be performed efficiently.

Further, even when an image area which protrudes from the recording medium is present, an image forming operation can be performed compulsorily. Consequently, when no important information is involved in the protruding image area or in a like case, an image forming operation can be continued, and accordingly, an image forming operation can be performed efficiently.

Further, even when some jam trouble occurs during feeding of a recording medium, the cleaning means can be rendered operative in accordance with the condition of the jam trouble while the image forming operation is restored to continue the image forming operation.

It is further understood by those skilled in the art that the foregoing description is a preferred embodiment of the disclosed device and that various changes and modifications may be made in the invention without departing from the spirit and scope thereof.

What is claimed is:

1. An image forming apparatus, comprising:

an image carrier for carrying a toner image thereon by an electrostatic attractive force;

a roller disposed for contacting with said image carrier;

feeding means for feeding a recording medium to and between said image carrier and said roller;

first electric field forming means for forming an electric field in a predetermined direction between said image carrier and said roller to cause a toner image carried on said image carrier to be transferred to a recording medium passing between said image carrier and said roller;

second electric field forming means for forming, between said image carrier and said roller, another electric field in the direction opposite to the direction of the electric field formed by said first electric field forming means;

recognizing means for recognizing a size of a toner image formed on said image carrier;

detecting means for detecting a size of a recording medium being fed by said feeding means;

comparing means for comparing a size of a toner image recognized by said recognizing means and a size of a recording medium detected by said detecting means; and controlling means response to a result of the comparison by said comparing means for rendering said second electric field forming means when the result of the comparison reveals a difference between the sizes compared with each other.

2. An image forming apparatus according to claim 1, further comprising size designating means for designating a size of a toner image to be formed on said image carrier to said recognizing means.

3. An image forming apparatus according to claim 1, further comprising receiving means for receiving data regarding a toner image to be formed on said image carrier, and image forming means for forming a toner image on said image carrier in response to data received by said receiving means.

4. An image forming apparatus according to claim 3, wherein said recognizing means recognizes a size of a toner image based on data received by said receiving means.

5. An image forming apparatus according to claim 1, wherein said detecting means stores a length in the feeding direction of a recording medium being fed and information of a specified size in a related condition and measures a length in the feeding direction of a recording medium being fed to detect a size of the recording medium.

6. An image forming apparatus according to claim 5, wherein said detecting means measures a length of a recording medium in the feeding direction from a feeding speed of the recording medium and a time required for a leading edge and a trailing edge of the recording medium to pass a predetermined position of a feeding path of the recording medium.

7. An image forming apparatus according to claim 6, further comprising warning means for developing a warning when a size of a recording medium being fed is smaller than a size recognized by said recognizing means.

8. An image forming apparatus according to claim 1, wherein said controlling means renders said second electric field forming means operative only when a size of a recording medium being fed is smaller than a size recognized by said recognizing means.

9. An image forming apparatus, comprising:

an image carrier for carrying a toner image thereon;

image forming means for forming a toner image on said image carrier;

a roller disposed for contacting with said image carrier to transfer a toner image carried on said image carrier to a recording medium at the contacting position;

feeding means for feeding a recording medium to and between said image carrier and said roller;

cleaning means for removing toner sticking to said roller;

recognizing means for recognizing a size of a toner image formed on said image carrier;

detecting means for measuring a time required for a leading edge and a trailing edge of a recording medium to pass a predetermined position of a feeding path along which the recording medium is fed and detecting a size of the recording medium in accordance with the passing time;

comparing means for comparing a size of a toner image recognized by said recognizing means and a size of a recording medium detected by said detecting means; and controlling means response to a result of the comparison by said comparing means for rendering said cleaning means operative when a result of the comparison reveals that the size of the recording medium being fed is smaller than the size recognized by said recognizing means.

10. An image forming apparatus according to claim 9, wherein said cleaning means applies to said roller a bias potential of a polarity same as that of charge applied to the toner.

11. An image forming apparatus according to claim 10, further comprising warning means for developing a warning when a size of a recording medium being fed is smaller than a size recognized by said recognizing means.

12. An image forming apparatus according to claim 9, further comprising second controlling means for inhibiting re-starting of image formation when a cleaning operation by said cleaning means is performed.

13. An image forming apparatus according to claim 12, wherein said second controlling means enables re-starting of image formation when a size of a toner image recognized by said recognizing means is changed.

14. An image forming apparatus according to claim 13, wherein said second controlling means requests transmission of image information again when image formation is to be re-started.

15. An image forming apparatus according to claim 13, further comprising size designating means for designating a size of a toner image to be formed on said image carrier to said recognizing means.

16. An image forming apparatus according to claim 12, wherein said second controlling means enables re-starting of image formation when replacement of a recording medium accommodated in said feeding means is detected.

17. An image forming apparatus according to claim 16, wherein said second controlling means requests transmission of image information again when image formation is to be re-started.

18. An image forming apparatus according to claim 16, further comprising detecting means for detecting presence or absence of a recording medium accommodated in said feeding means and determining, when a condition wherein a recording medium is present is detected after another condition wherein no recording medium is present is detected, that the recording medium has been replaced.

19. An image forming apparatus according to claim 12, wherein said second controlling means enables re-starting of image formation after lapse of a predetermined time.

20. An image forming apparatus according to claim 19, wherein said second controlling means requests transmission of image information again when image formation is to be re-started.

21. An image forming apparatus according to claim 9, wherein said controlling means determines, based on a result of the comparison by said comparing means, a magnitude of an area of an image to be formed at a position corresponding to the outside of the recording medium and controls a cleaning operation of said cleaning means so that cleaning may be performed by an amount corresponding to the magnitude thus determined.

22. An image forming apparatus, comprising:

an image carrier for carrying a toner image thereon;

a roller disposed for contacting with said image carrier to transfer a toner image carried on said image carrier to a recording medium at the contacting position;

accommodating means for accommodating a recording medium therein;

feeding means for taking out a recording medium from said accommodating means and feeding the recording medium to and between said image carrier and said roller;

incomplete feeding detecting means including at least a sensor for detecting presence or absence of a recording medium immediately subsequently to said accommodating means to detect incomplete feeding of a recording medium by said feeding means;

cleaning means for removing toner sticking to said roller when incomplete feeding is detected by said incomplete feeding detecting means; and controlling means for changing, when incomplete feeding is detected and said sensor does not detect presence of a recording medium, the time for cleaning to be performed by said cleaning means.

23. An image forming apparatus according to claim 22, wherein said controlling means controls, when said sensor does not detect presence of a recording medium, said cleaning means so that cleaning may be started automatically subsequently to detection of incomplete feeding.

24. An image forming apparatus according to claim 23, wherein said controlling means decreases the cleaning time when said sensor does not detect presence of a recording medium.

25. An image forming apparatus according to claim 22, wherein said controlling means decreases the cleaning time to zero when said sensor does not detect presence of a recording medium.

* * * * *